United States Patent [19]

Arikawa

[11] Patent Number: 4,893,880
[45] Date of Patent: Jan. 16, 1990

[54] ANTI-SKID CONTROL APPARATUS FOR A VEHICLE BRAKING SYSTEM

[75] Inventor: Tetsuro Arikawa, Kanagawa, Japan

[73] Assignee: Nippon A B S, Ltd., Tokyo, Japan

[21] Appl. No.: 194,414

[22] Filed: May 13, 1988

[30] Foreign Application Priority Data

May 16, 1987 [JP] Japan .................... 62-119832

[51] Int. Cl.$^4$ .............................. B60T 8/62
[52] U.S. Cl. ..................... 303/110; 303/68;
303/96; 303/102; 303/111
[58] Field of Search ............ 303/91, 92, 93, 94–119, 303/68, 69, 61, 63; 188/181 A; 180/197, 244; 364/426

[56] References Cited

U.S. PATENT DOCUMENTS

| 3,861,756 | 1/1975 | Arikawa . | |
|---|---|---|---|
| 3,907,377 | 9/1975 | Mayer | 303/21 F |
| 4,181,373 | 1/1980 | Vannini et al. . | |
| 4,421,361 | 12/1983 | Arikawa et al. | 303/92 |
| 4,425,622 | 1/1984 | Arikawa | 303/93 X |
| 4,435,768 | 3/1984 | Arikawa | 303/105 X |
| 4,439,832 | 3/1984 | Sato et al. | 364/426 |
| 4,453,782 | 6/1984 | Arikawa et al. | 303/68 X |
| 4,517,647 | 5/1985 | Harada et al. | 303/93 X |
| 4,637,664 | 1/1987 | Arikawa | 303/111 |
| 4,740,040 | 4/1988 | Arikawa | 303/96 |
| 4,744,610 | 5/1988 | Arikawa | 303/92 |
| 4,753,493 | 6/1988 | Arikawa | 303/111 X |
| 4,776,644 | 10/1988 | Arikawa | 303/104 X |
| 4,783,126 | 11/1988 | Arikawa . | |
| 4,793,662 | 12/1988 | Arikawa . | |

FOREIGN PATENT DOCUMENTS

| 2007787 | 5/1979 | United Kingdom . |
| 2045372 | 10/1980 | United Kingdom . |
| 2092249 | 7/1985 | United Kingdom . |
| 2182109 | 5/1987 | United Kingdom . |
| 2191553 | 12/1987 | United Kingdom . |
| 2164399 | 2/1988 | United Kingdom . |
| 2193275 | 2/1988 | United Kingdom . |
| 2194825 | 3/1988 | United Kingdom . |
| 2196073 | 4/1988 | United Kingdom . |
| 2196402 | 4/1988 | United Kingdom . |

Primary Examiner—Douglas C. Butler
Attorney, Agent, or Firm—Jones, Day, Reavis & Pogue

[57] ABSTRACT

In an anti-skid control apparatus for a four-wheeled vehicle, fluid pressure control valve devices are arranged in the respective brake conduits, and a control unit determines which side of the road has a lower coefficient of friction. This side is called the low side. The fluid pressure control valve device connected to the one front wheel on the low side effects brake relieving control on the basis of the brake relieving signal of the one of the front and rear wheels on the low side which has generated the brake relieving signal sooner than the other. In the alternative, it effects brake relieving control on the basis of the brake relieving signal of the one or ones of the front wheels on the low side of the rear wheels which has generated the brake relieving signal sooner than the other or others.

44 Claims, 11 Drawing Sheets

ANTI-SKID CONTROL APPARATUS FOR A VEHICLE BRAKING SYSTEM

BACKGROUND OF THE INVENTION

1. Field of the Invention:

This invention relates to an anti-skid control apparatus for a vehicle braking system which can prevent locking of the wheels.

2. Description of the Prior Art:

An anti-skid control apparatus for a vehicle braking system is known that includes fluid pressure control valve devices arranged between fluid pressure generating chambers of a tandem master cylinder and the wheel cylinders of the front wheels, respectively, and a control unit receiving outputs of wheel speed sensors to measure skid conditions of the front and rear wheels and to generate instructions for controlling the fluid pressure control valve devices.

When a fluid pressure control valve device is provided for each of four wheels (four channels), and their fluid pressures are independently controlled, there is no problem of controlling operation. Or when a fluid pressure control valve device is provided for each of the front wheels and for both of the rear wheels in common (three channels), there is no problem of controlling operation. In the latter case, the one common fluid pressure control valve device is controlled on the basis of the lower one of the speeds of the rear wheels.

However, the above case require three or four fluid pressure control valve devices. Accordingly, the whole anti-skid control apparatus is big and very heavy. Since the fluid pressure control valve device is expensive, the cost is high.

This Applicant previously proposed (Japanese Patent Application No. 247146/1986) in consideration of the above problems and in order to provide an anti-skid control apparatus for a vehicle braking system which can be of the two-channel type, small-sized and light, and can be stable in steering. This anti-skid control apparatus for a vehicle braking system includes (A) a pair of front wheels and a pair of rear wheels; (B) wheel speed sensors associated with the wheels, respectively; (C) a first fluid pressure control valve device for controlling the brake fluid pressure of the wheel cylinder of one of the front wheels, arranged between a first fluid pressure generating chamber of a tandem master cylinder and the wheel cylinder of the one front wheel; (D) a second fluid pressure control valve device for controlling the brake fluid pressure of the wheel cylinder of another of the front wheels, arranged between a second fluid pressure generating chamber of said tandem master cylinder and said wheel cylinder of the other front wheel; and (E) a control unit receiving outputs of the wheel speed sensors to measure the skid conditions of the front and rear wheels and to generate instructions for controlling the first and second fluid pressure control valve devices. The control unit discriminates the frictionally lower one (designated as "low side") of the sides of the road on which the wheels are running on the basis of measuring the skid conditions of the rear and/or front wheels and combines logically the measurement of the skid condition of the one rear wheel running on said low side of the road with that of the one front wheel running on the low side and generates an instruction for controlling the first or second fluid pressure control valve device for the corresponding front wheel. It also generates the instruction for controlling the second or first fluid pressure control valve device for the other front wheel, on the basis of the measurement of the skid condition of the other front wheel running on the high side (frictionally higher side) independently of those of the rear wheels. This anti-skid control apparatus for a vehicle braking system includes (A) a pair of front wheels, and a pair of rear wheels; (B) wheel speed sensors associated with the wheels, respectively; (C) a first fluid pressure control valve device for controlling the brake fluid pressure of the wheel cylinder of one of the front wheels, arranged between a first fluid pressure generating chamber of a tandem master cylinder and the wheel cylinder of the one front wheel; (D) a second fluid pressure control valve device for controlling the brake fluid pressure of the wheel cylinder of another of the front wheels, arranged between a second fluid pressure generating chamber of the tandem master cylinder and said wheel cylinder of the other front wheel; and (E) a control unit receiving outputs of said wheel speed sensors for measuring or judging the skid conditions of said front and rear wheels and for generating instructions for controlling said first and second fluid pressure control valve devices. In this devices the control unit selects the frictionally lower (designated as "low side") of the sides of the road on which the wheels are running on the basis of measuring the skid conditions of the rear and/or front wheels and combining logically the measurement of the skid conditions of the rear wheels with the measurement of the skid condition of the one front wheel running on the low side for generating the instruction for controlling said first or second fluid pressure control valve device for the corresponding front wheel, and generates the instruction for controlling said second or first fluid pressure control valve device for the other front wheel, on the basis of the measuring or judging result of the skid condition of the other front wheel running on the high side (frictionally higher side) independently of those of the rear wheels.

In the above-described apparatus, the brake relieving instruction for decreasing the brake fluid pressure, on the basis of the instructions for controlling the first or second fluid pressure control valve device, obtained from the logical combination of the judging results, is formed by the logical sum (OR) of the brake relieving instructions for the one front wheel and rear wheel on the same low side or for the one front wheel on the low side and both rear wheels.

In a 4WD vehicle, the rotational speeds of all wheels are coupled together mechanically and are substantially identical when the vehicle is moving in a straight line and is not being braked. When the anti-skid control is in operation, wheels that are driven by the same differential transmit torque through the differential to each other with a time delay of, for example, about 100 milliseconds. The same effect is apparent when two drive shafts are driven by the same differential. Thus, when one wheel is slowed more than the other that is on its differential, the other wheel receives more torque, increasing its rotational speed, but with the above time delay. This time delay is added to the brake relieving time, which reduces braking effectiveness.

SUMMARY OF THE INVENTION

Accordingly, it is an object of this invention to provide an anti-skid control apparatus for a vehicle braking system by which the brake can be prevented from being relieved too much, and the braking distance can be shortened, having the effects of the above-described, previously proposed anti-skid control apparatus.

In accordance with an aspect of this invention, in an anti-skid control apparatus for a vehicle braking system including: (A) a pair of front wheels, and a pair of rear wheels, (B) wheel speed sensors associated with the wheels, (C) a first fluid pressure control valve device for controlling the brake fluid pressure of the wheel cylinder of one of the front wheels, arranged between a first fluid pressure generating chamber of a tandem master cylinder and the wheel cylinder of the one front wheel; (D) a second fluid pressure control valve device for controlling the brake fluid pressure of the wheel cylinder of another of the front wheels, arranged between a second fluid pressure generating chamber of the tandem master cylinder and the wheel cylinder of the other front wheel; and (E) a control unit receiving outputs of the wheel speed sensors to measure the skid conditions of the front and rear wheels and generate instructions for controlling the first and second fluid pressure control valve devices; in which said control unit discriminates the frictionally lower one (designated as "low side") of the sides of the road on which said wheels are running, on the basis of the measured results of the skid conditions of said rear and/or front wheels, combines logically the measuring or judging result of the skid condition of the one rear wheel running on said low side of the road, with that of the one front wheel running on the same side as the low side, for generating the instruction for controlling said first or second fluid pressure control valve device for the corresponding front wheel, and generates the instruction for controlling said second or first fluid pressure control valve device for the other front wheel, on the basis of the measuring or judging result of the skid condition of the other front wheel running on the high side (frictionally higher side) independently of those of said rear wheels; the improvements in which a brake relieving instruction for decreasing the brake fluid pressure, of said instructions for controlling the first or second fluid pressure control valve device, is formed on the basis of the judging result of the one of the front wheel and rear wheel on the low side which generates a brake relieving signals for decreasing the brake fluid pressure, sooner than the other thereof.

In accordance with another aspect of this invention, in an anti-skid control apparatus for a vehicle braking system including:

(A) a pair of front wheels, and a pair of rear wheels;
(B) wheel speed sensors associated with the wheels;
(C) a first fluid pressure control valve device for controlling the brake fluid pressure of the wheel cylinder of one of said front wheels, arranged between a first fluid pressure generating chamber of a tandem master cylinder and said wheel cylinder of the one front wheel;
(D) a second fluid pressure control valve device for controlling the brake fluid pressure of the wheel cylinder of another of the front wheels, arranged between a second fluid pressure generating chamber of the tandem master cylinder and the wheel cylinder of the other front wheel; and
(E) a control the receiving outputs of said wheel speed sensors for measuring the skid conditions of the front and rear wheels and for generating instructions for controlling said first and second fluid pressure control valve devices and in which the control unit discriminates the frictionally lower one (designated as "low side") of the sides of the road on which said wheels are running, on the basis of the measuring results of the skid conditions of said rear and/or front wheels, combines logically the measuring results of the skid conditions of the rear wheels with the measuring result of the skid condition of the one front wheel running on the low side to generate on the instruction for controlling the first or second fluid pressure control valve device for the corresponding front wheel, and generates an instruction for controlling the second or first fluid pressure control valve device for the other front wheel, on the basis of the measured result of the skid condition of the other front wheel running on the high side (frictionally higher side) independently of those of said rear wheels; the improvements in which a brake relieving instruction for decreasing the brake fluid pressure, of said instructions for controlling the first or second fluid pressure control valve device, is formed on the basis of the judging result of the one or ones of the rear wheels and of the front wheel on the low side which generates a brake relieving signal for decreasing the brake fluid pressure, sooner than the other or others thereof.

The foregoing and other objects, features, and advantages of the present invention will be more readily understood upon consideration of the following detailed description of the preferred embodiments of the invention, taken in conjunction with the accompanying drawings.

BRIEF DESCRIPTION OF THE DRAWINGS

FIG. 11 is a set of graphs for comparing the operations and effects of the embodiments of this invention with those of the prior art.

DESCRIPTION OF THE PREFERRED EMBODIMENTS

Figure 1:
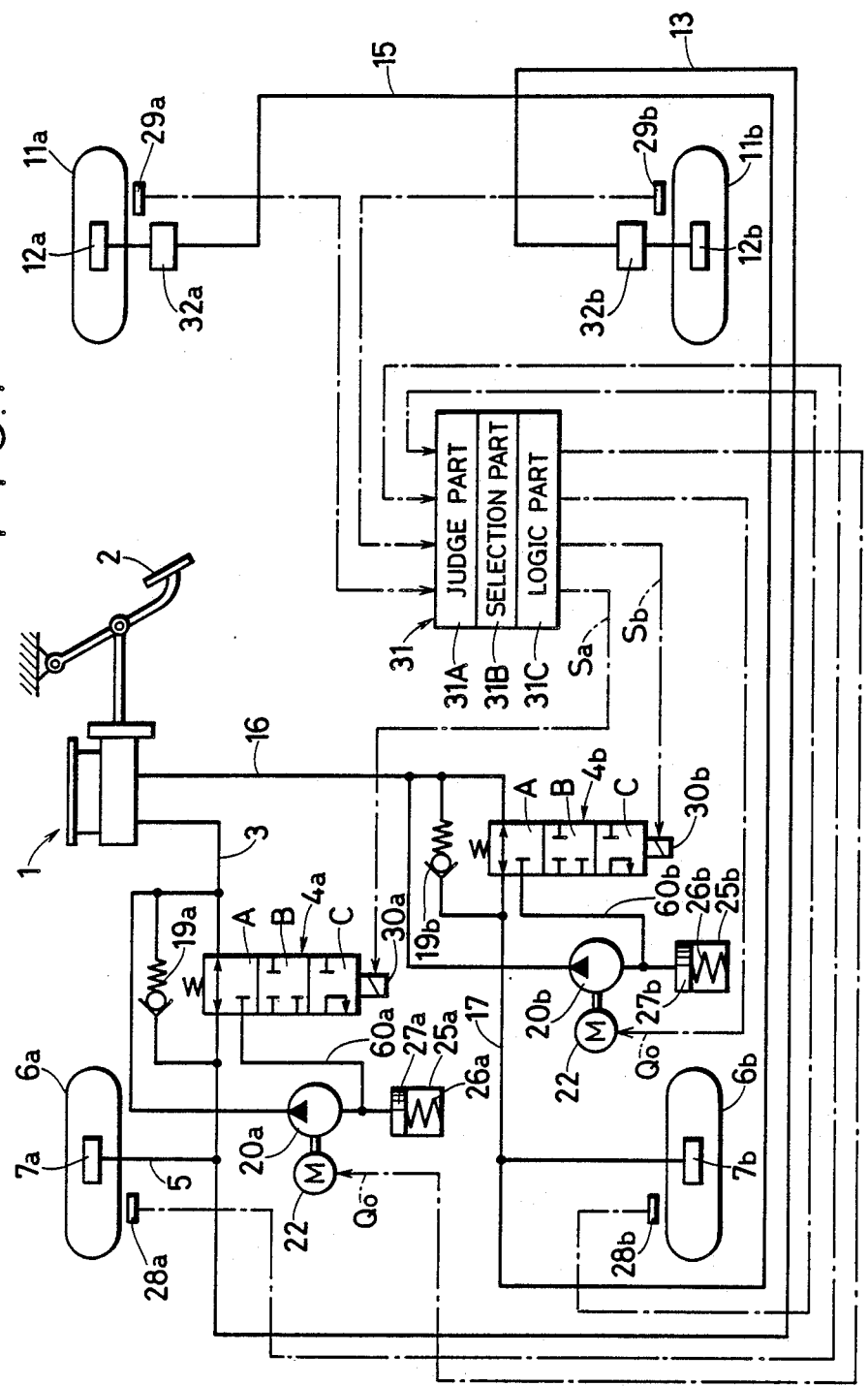
FIG. 1 is a schematic view of an anti-skid control apparatus according to a first embodiment of this invention.

In FIG. 1, a brake pedal 2 is connected to a tandem master cylinder 1. One fluid pressure chamber of the tandem master cylinder 1 is connected to a wheel cylinder 7a of a right front wheel 6a through a conduit 3, an electromagnetic three-position valve device 4a and a conduit 5. The conduit 5 is further connected to a wheel cylinder 12b of a left rear wheel 11b through a conduit 13 and a proportioning valve 32b.

Another fluid pressure chamber of the tandem master cylinder 1 is connected to a wheel cylinder 7b of the left front wheel 6b through the conduit 16, an electromagnetic three-position valve device 4b and a conduit 17. The conduit 17 is further connected to a wheel cylinder 12a of a right rear wheel 11a through a conduit 15 and a proportioning valve 32a.

Discharge openings of the valve devices 4a and 4b are connected through conduits 60a and 60b to hydraulic reservoirs 25a and 25b, respectively. The hydraulic reservoirs 25a and 25b include pistons 27a and 27b slidably fitted to casings and relatively weak springs 26a and 26b. Reserving chambers of the reservoirs 25a and 25b are connected to suction openings of fluid pressure pumps 20a and 20b.

Although the fluid pressure pumps 20a and 20b are schematically shown, each of them consists of a pair of casings, pistons slidably fitted to the casings, an electric motor 22 reciprocating the pistons, and check valves. Supply openings of the fluid pressure pumps 20a and 20b are connected to the conduits 3 and 16. Although two electric motors 22 are shown in FIG. 1, they typically represent a single electric motor.

Wheel speed sensors 28a, 28b, 29a and 29b are associated with the wheels 6a, 6b, 11a and 11b, respectively, and they generate pulse signals having frequencies proportional to the rotational speeds of the wheels 6a, 6b, 11a and 11b. The pulse signals of the wheel speed sensors are supplied to a control unit 31 according to this invention.

Although described hereinafter in detail, the control unit 31 consists of a judge part 31A, a selection part 31B and a logic part 31C. Output terminals of the wheel speed sensors 28a, 28b, 29a and 29b are connected to input terminals of the judge part 31A. The judge part 31A receives the wheel speed signals, judges them and supplies the judge results to the selection part 31B and the logic part 31C. As will be hereinafter described, the outputs of the selection part 31B and the judge results are logically combined with each other in the logic part 31C. Control signals Sa and Sb, and motor drive signals Qo as the calculation or measurement results, are generated from the control unit 31 and are supplied to solenoid portions 30a and 30b of the valve devices 4a and 4b and motor 22, respectively. Dashed lines represent electric lead wires.

Although schematically shown, the electro magnetic valves devices 4a and 4b have well-known constructions. The valve devices 4a and 4b take any one of three positions A, B and C in accordance with the current intensities of the control signals Sa and Sb.

When the control signals Sa and Sb are "0" in current level, the valve devices 4a and 4b take first positions A for increasing the brake pressure to the brake for the wheel, respectively. In the first position A, the master cylinder side and the wheel cylinder side are connected together. When the control signals Sa and Sb are "½" in current level, the valve devices 4a and 4b take second positions B to maintain the brake pressure constant. In the second position B, the communications between the master cylinder side and the wheel cylinder side, and between the wheel cylinder side and the reservoir side are interrupted. When the control signals Sa and Sb are "1" in current level, the valve devices 4a and 4b take third positions C to decrease the pressure to the brake. In the third position C, the communication between the master cylinder side and the wheel cylinder side is interrupted, while the wheel cylinder side and the reservoir side are connected. The brake fluid is discharged through the conduits 60a and 60b into the reservoirs 25a and 25b from the wheel cylinders 7a, 7b and 12a and 12b.

The control unit 31 further generates a drive signal Qo for the motor 22. When any one of the control signals Sa and Sb first becomes "1", the drive signal Qo is generated, and it is held during the skid control operation. The drive signal Qo is supplied to the motor 22.

Figure 2:
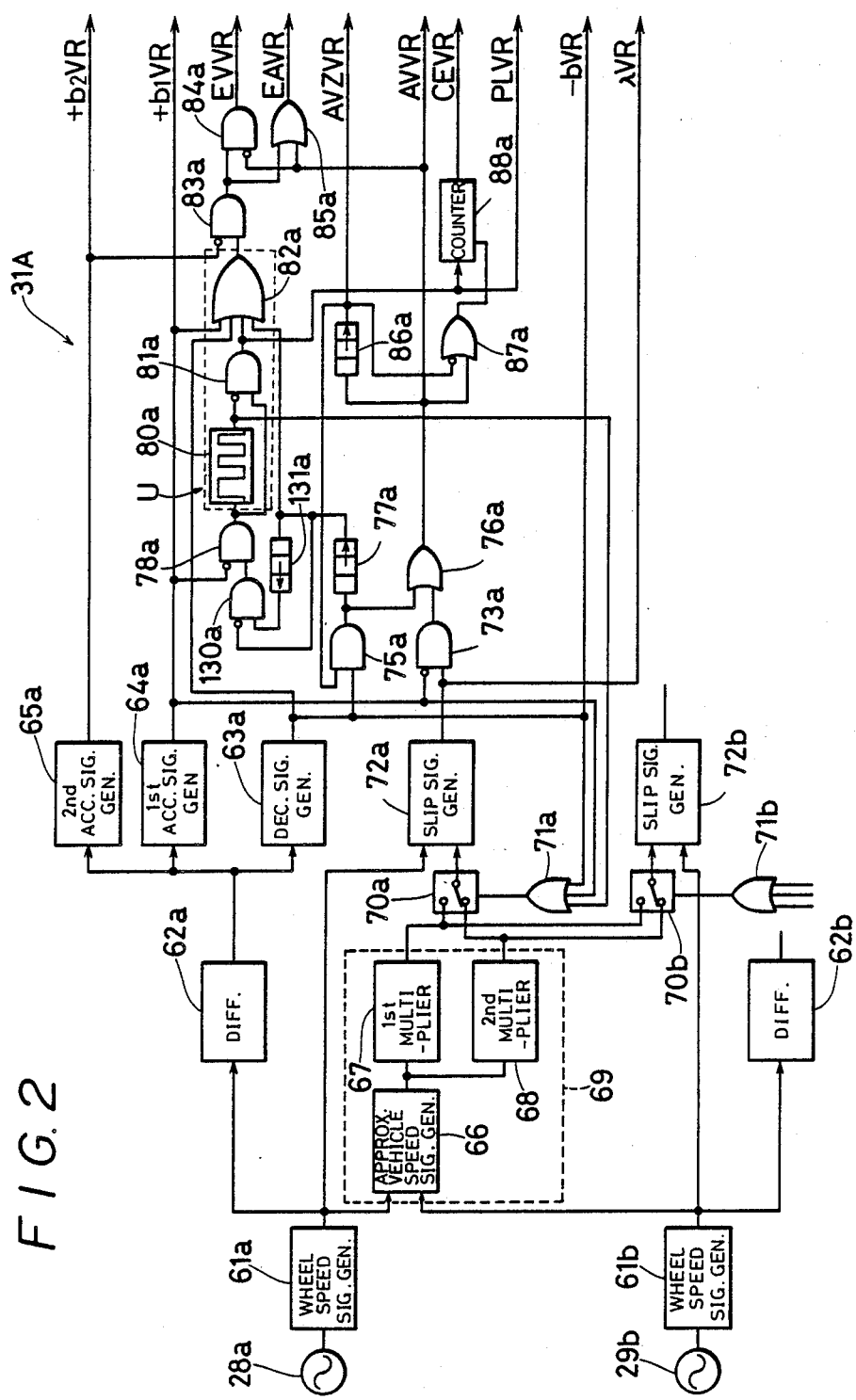
FIG. 2 is a circuit diagram of a judge part in FIG. 1.

Next, the details of the judge part 31A in the control unit 31 will be described with reference to FIG. 2. The judge part 31A receives the outputs of the sensors 28a, 28b, 29a and 29b to judge the skid conditions of the wheels 6a, 6b, 11a and 11b. The judge circuits for the respective wheels 6a, 6b, 11a and 11b are the same in construction. FIG. 2 shows only the judge circuit for the right front wheel 6a. It will be representatively described hereinafter. However, it showes components with the judge circuit for the left rear wheel 11b of the same conduit system. Accordingly, only a part of the judge circuit for the left rear wheel 11b is shown in FIG. 2. The signals from the wheel speed sensors 28a and 29b are supplied to wheel speed signal generators 61a and 61b. Digital or analogue outputs proportional to the wheel speeds are obtained from the wheel speed signal generators 61a and 61b and they are supplied to differentiators 62a and 62b, slip signal generators 72a and 72b and a slip ratio setting circuit 69. The circuit 69 is part of the judge circuits for the front and rear wheels 6a and 11b of the same conduit system. It consists of an approximate vehicle speed signal generator 66 and multipliers 67 and 68. The higher of the outputs of the wheel speed signal generators 61a and 61b is selected, and an approximate vehicle speed signal is formed on the basis of the higher one, in the approximate vehicle speed signal generator 66. For example, multiplier numbers 0.85 and 0.70 are set in the multipliers 67 and 68, respectively. Output terminals of the slip ratio setting circuit 69 are connected to change over circuits 70a and 70b. In the circuits 70a and 70b, movable contacts are normally connected to the output sides of the multiplier 68. Output terminals of the changeover circuits 70a and 70b are connected to the slip signal generators 72a, 72b. The outputs of the changeover circuits 70a and 70b, and thus, the values of (the approximate vehicle speed x the output 0.85 or 0.70 of the multiplier 67 or 68) are compared with the wheel speeds as determined from the outputs of the wheel speed signal generators 61a and 61b, in the slip signal generators 72a and 72b. When the former values are smaller than the latter ones, the slip signal generators 72a and 72b generate slip signals λ. Since the judge circuits are the same for the left rear wheel 11b and right front wheel 6a, only the judge circuit for the right front wheel 6a will be described.

The differentiator 62a receives the output of the wheel speed signal generator 61a and differentiates it with respect to time. The output of the differentiator 62a is supplied to a deceleration signal generator 63a and to first and second acceleration signal generators 64a and 65a. A predetermined threshold deceleration (for example, −1.4 g) is set in the deceleration signal generator 63a, and it is compared with the output of the differentiator 62a. Predetermined threshold accelerations (for example, 0.5 g and 7 g) are set in the first and second acceleration signal generators 64a and 65a respectively and they are compared with the output of the differentiator 62a. When the deceleration of the wheel becomes larger than the predetermined threshold deceleration (−1.4 g), a deceleration signal −b is generated from the deceleration signal generator 63a. When the acceleration of the wheel becomes larger than the predetermined threshold acceleration (0.5 g) or (7 g), an acceleration signal $+b_1$ or $+b_2$ is generated from the acceleration signal generator 64a or 65a.

An output terminal of the first acceleration signal generator 64a is connected to negation input terminals (indicated by circle O) of AND gates 73a and 78a, and a first input terminal of an OR gate 82a. An output terminal of the AND gate 78a is connected to an input terminal of a pulse generator 80a and an input terminal of an AND gate 81a. An output terminal of the pulse generator 80a is connected to a negation input terminal of the AND gate 81a. A stepwise brake-increasing signal generator (U) is formed by the pulse generator 80a, the OR gate 82a, and the AND gate 81a, and it generates pulse signals to slowly increase the brake pressure. The width of the first pulse is so designed as to be larger than that of the following pulses in the pulse generator 80a. This keeps the braking force from being too low.

The output terminal of the deceleration signal generator 63a is connected to a second input terminal of the OR gate 82a. The output terminal of the AND gate 81a is connected to a third input terminal of the OR gate 82a. The output terminal of the slip signal generator 72a is connected to the other input terminal of the AND gate 73a. The output terminal of the AND gate 73a is connected to one input terminal of an OR gate 76a. An output terminal of an AND gate 75a is connected to another input terminal of the OR gate 76a. The output terminal of the deceleration signal generator 63a is connected to one input terminal of the AND gate 75a and an output terminal of an OFF delay timer 86a is connected to another input terminal of the AND gate 75a. The delay time of the OFF delay timer 86a is sufficiently long so that once the output of the OFF delay timer 86a becomes "1", it is maintained during the antiskid control operation. An output terminal of the OR gate 76a is connected to an input terminal of the OFF delay timer 86a, and also to one input terminal of an OR gate 87a. The output terminal of the OFF delay timer 86a is connected to another negation input terminal of the OR gate 87a.

An output terminal of the OR gate 87a is connected to one input terminal of a counter 88a, and the output terminal of the AND gate 81a of the stepwise brake-increasing signal generator U is connected to another input terminal of the counter 88a. Pulses from the AND gate 81a are counted by the counter 88a. When the counted number reaches a predetermined number, the output of the counter 88a becomes "1", and when the output of the OR gate 87a becomes "1", the content of the counter 88a is reset.

The output terminals of the deceleration signal generator 63a, first acceleration signal generator 64a, and pulse signal generator 80a are further connected to the input terminals of an OR gate 71a. The changeover circuit 70a is changed over by the output of the OR gate 71a. When the output of the OR gate 71a becomes "1", the movable contact of the changeover circuit 70a is changed over to the output side of the multiplier 67.

The output terminal of the OR gate 82a is connected to one input terminal of an AND gate 83a, and the output terminal of the second acceleration signal generator 65a is connected to another negation input terminal. The output terminal of the AND gate 83a is connected to one input terminal of an AND gate 84a and OR gate 85a. The output terminal or the OR gate 76a is connected to another negation input terminal of the AND gate 84a and to another input terminal of the OR gate 85a.

The output terminal of the AND gate 75a is connected to an OFF delay timer 77a, the output terminal of which is connected to a fourth input terminal of the OR gate 82a, another OFF delay timer 131a and also a negation input terminal of an AND gate 130a. The output terminal of the OFF delay timer 131a is connected to another input terminal of the AND gate 130a.

The judge circuit for the right front wheel 6a is constructed as described above. Ten kinds of signals are taken out from this circuit. They will be denominated as shown in the right end of FIG. 2. The output signal of the second acceleration signal generator 65a is denominated as $+b_2VR$, that of the first accelerator signal generator 64a as $+b_1VR$, that of the AND gate 84a as EVVR, those of the OR gates 85a and 76a as EAVR and AVVR, respectively, that of the OFF delay timer 86a as AVZVR, that of the counter 88a as CEVR, that of the deceleration signal generator 63a as bVR that of the AND gate 81a as PLVR, and that of the slip signal generator 72a as λVR. The letter "V" means "front side", and the letter "R" means "right side".

The judge circuits for the left rear wheel 11b, the left front wheel 6b and the right rear wheel 11a are constructed similarly. The ten kinds of signals $+b_2HL$, $+b_1HL$, EVHL, EAHL, AVZHL, AVHL, CEHL, PLHL, −bHL and λHL are taken out from the judge circuit for the left rear wheel 11b, where the letter "H" means "rear side" and the letter "L" means "left side". Similarly $+b_2VL$, $+b_1VL$, EVVL, EAVL, AVZVL, AVVL, CEVL, PLVL, −bVL and λVL, and $+b_2HR$, $+b_1HR$, EVHR, EAHR, AVZHR, AVHR, CEHR, PLHR, −bHR and λHR are taken out from the judge circuits for the left front wheel 6b and the right rear wheel 11a, respectively.

Next, the details of the selection part 31B of the control unit 31 will be described with reference to FIG. 3. The selection part 31B is constructed symmetrically with respect to the rear wheels 11a and 11b. The output signals EVHR, EVHL, $\overline{AVZHR}$, $\overline{AVZHL}$ (negations of AVZHR and AVZHL, respectively), CEHR, CEHL, AVHR, AVHL, EAHR and EAHL from the judge part 31A are supplied to the selection part 31B. The output signals EVHR and EVHL are supplied to one input terminal of AND gates 49a and 49b, respectively and to input terminals of an OR gate 53. The output signals $\overline{AVZHR}$ and $\overline{AVZHL}$ are supplied to one input terminal of OR gate 51a and 51b, respectively. The output signals CEHR and CEHL are supplied to other input terminals of the OR gates 51a and 51b. Output terminals of the OR gates 51a and 51b are connected to reset terminals $R_1$ and $R_2$ of flip-flops 59a and 59b, respectively.

The flip-flops 59a and 59b are of the D-type. The output signals AVHR and AVHL are supplied to set terminals $S_1$ and $S_2$ of the flip-flops 59a and 59b, and they are further supplied to an OR gate 56.

The output signals EAHR and EAHL are negated, and then supplied to clock terminals $C_1$ and $C_2$ of the flip-flops 59a and 59b. Output terminals $Q_1$ and $Q_2$ of the flip-flops 59a and 59b are connected to other input terminals of the AND gate 49a and 49b. Negation output terminals $\overline{Q_1}$ and $\overline{Q_2}$ are connected to data terminals $D_2$ and $D_1$ of other flip-flops 59b and 59a, and are also connected to input terminals of an AND gate 52. An output terminal of the OR gate 53 is connected to the remaining one input terminal of the AND gate 52. Output terminals of the AND gates 49a and 49b, 52 are connected to input terminals of an OR gate 54. An output terminal of the OR gate 54 is connected to one input terminal of an AND gate 55. An output terminal of the OR gate 56 is connected to another negation input terminal of the AND gate 55. Output terminals of the AND gate 55 and OR gate 56 are connected to input terminals of an OR gate 57.

The output signals EVHR and EVHL are further supplied to one negation input terminal of each of AND gates 58a and 58b, and to other input terminals of the other AND gates 58b and 58a. Output terminals of the AND gates 58a and 58b are connected to a set terminals of a flip-flop 50, and a reset terminal R thereof. A signal SLA is obtained from an output terminal Q of the flip-flop 50, and it is supplied to the subsequent logic part 31C. An output f of the AND gate 55 is denominated as EVH, output g of the OR gate 57 as EAH, and output e of the OR gate 56 as AVH. They are supplied to the subsequent logic part 31C. Thus, first select-low control signals EVH, EAH and AVH are formed from the judge results of the skid conditions of both of the rear wheels 11a and 11b.

Next, the logic part 31C of the control unit 31 will be described in detail with reference to FIG. 4. The logic part 31C is constructed nearly symmetrically with respect to the right and left wheels. The input signals CEVL, CEVR, AVZVL, AVZVR, EVVL, EVVR, AVVL, AVVR, EAVL, EAVR, CEHL, CEHR, AVHL, AVHR, PLHL, PLHR, PLVL, PLVR are supplied from the judge part 31A, and the input signals EVH, AVH, EAH and SLA are supplied from the selection part 31B.

The signals CEVL and CEVR are supplied to one input terminal each of OR gates 205a and 205b. The signals AVZVL and AVZVR are supplied to another negation input terminals of the OR gates 205a and 205b. Output terminals of the OR gates 205a and 205b are connected to reset terminals of flip-flops 201a and 201b. The signals EVVL and EVVR are supplied to one input terminal each of AND gates 203a and 203b and OR gates 207a and 207b.

The signals AVVL and AVVR are supplied to set terminals S of the flip-flops 201a and 201b, set terminals of second flip-flops 300a and 300b and one input terminal each of AND gates 302a and 302b. Q output terminals of the second flip-flops 300a and 300b are conencted to other input terminals of the AND gates 302a and 302b. Output terminals of the AND gates 302a and 302b are connected to one input terminal each of OR gates 211a and 211b. The signals EAVL and EAVR are negated and then supplied to clock terminals C of the flip-flops 201a and 201b. Output terminals Q of the flip-flops 201a and 201b are connected to other input terminals of the AND gates 203a and 203b. $\overline{Q}$ terminals of the flip-flops 201a and 201b are connected to first input terminals of AND gates 208a and 208b, and further to data terminals D of third flip-flops 202a and 202b. Similarly, $\overline{Q}$ terminals of the flip-flops 202a and 202b are connected to data terminals D of the other flip-flops 201a and 201b, and they are connected to third input terminals of the AND gates 208a and 208b. Output terminals of the OR gates 207a and 207b are connected to second input terminals of the AND gates 208a and 208b.

The signals AVHL and AVHR are supplied to set terminals S of the flip-flops 202a and 202b. Q output terminals of the flip-flops 202a and 202b are connected to input terminals of AND gates 204a, 204b and 212a and 212b. Further, they are connected to third input terminals of the OR gates 206b and 206a. Output terminals of the AND gates 204a and 204b are connected to third input terminals of OR gates 209a and 209b. Output terminals of the AND gates 203a and 203b and 208a and 208b are connected to first and second input terminals thereof, respectively.

Output terminals of AND gates 212a and 212b are connected to OFF delay timers 307a and 307b, set terminals S of fourth flip-flops 301a and 301b and input terminals of AND gates 303a and 303b. Q output terminals of the flip-flops 301a and 301b are connected to other input terminals of the AND gates 303a and 303b. The Q output terminals thereof are further connected to first input terminals of OR gates 304a and 304b. The output terminals of the OFF delay timers 307a and 307b are connected to third negation input terminals of other OR gates 305a and 305b. Output terminals of AND gates 306a and 306b are connected to second input terminals of the OR gates 304a and 304b and 305a and 305b. The signals PLVL, PLHL, PLHR and PLVR are supplied to input terminals of the AND gates 306a and 306b, respectively.

Q output terminals of the second flip-flops 300a and 300b are connected to first input terminals of the OR gates 305a and 305b. The signals AVZVL and AVZVR are supplied to third negation input terminals of the OR gates 304a and 304b. Q output terminals of the fourth flip-flops 301a and 301b are connected to other input terminals of the AND gates 303a and 303b, and are further connected to first input terminals of the OR gates 304a and 304b. Output terminals of the AND gates 303a and 303b are connected to other input terminals of the OR gates 211a and 211b.

The OFF delay timers 307a and 307b correspond to the OFF delay timer 86a in FIG. 2. Their delay time is so long that the ON state can be normally continued during the anti-skid control operation. The second and fourth flip-flops 300a 300b, 301a and 301b are of the reset priority type.

Output terminals of the OR gates 209a, 209b 211a and 211b are connected to input teminals of AND gates 210a and 210b, and to other negation input terminals thereof. The signals AVHL and AVHR are further connected to third input terminals of AND gates 213b and 213a. The signals PLHL, PLVL, PLHR and PLVR are supplied to first and second input terminals of the AND gates 213a and 213b, respectively. Output terminals of the AND gates 213a and 213b are connected to second input terminals of the OR gates 206a and 206b. The signals CEHL and CEHR are supplied to first input terminals of the OR gates 206a and 206b.

The signal EVH is supplied to input terminals of AND gates 214a and 214b, and also to the other input terminals of the AND gates 204a and 204b. Output terminals of the AND gates 214a and 214b are connected to the other input terminals of the OR gates 207a and 207b. The signal SLA is supplied to another input terminal of the one AND gate 214a, while the signal SLA is negated and then supplied to another input terminal of the other AND gate 214b. The signal AVH is supplied to other input terminals of the AND gates 212a and 212b, and the signal EAH is negated and then supplied to clock terminals C of the flip-flops 202a and 202b.

The result of the foregoing description is that, the first select-low control signals are logically combined with the judge results of the front wheel running on the frictionally low side of the road to form second select-low control signals.

Output signals EV' and EV of the AND gates 210a and 210b at the last stage of the logic part 31C correspond to the control signals Sb and Sa of the current level "½", and they are supplied to the solenoid portion 30b and 30a of the changeover valves 4b and 4a in FIG. 1, respectively. Output signals AV' and AV of the OR gates 211a and 211b at the last stage of the logic part 31C correspond to the control signals Sb and Sa of the current level "1", and they are supplied to the solenoid portions 30b and 30a of the changeover valves 4b and 4a in FIG. 1, respectively.

The logic part 31C includes a motor drive circuit. It consists of OFF delay timers 144a, 144b, an OR gate 145 and an amplifier 146 connected to an output terminal of the OR gate 145. The outputs of the AND gates 303a and 303b, are supplied through the OFF delay timers 144a and 144b to input terminals of the OR gate 145. An output Qo of the amplifier 146 is supplied to the motor 22 in FIG. 1.

Figure 5:
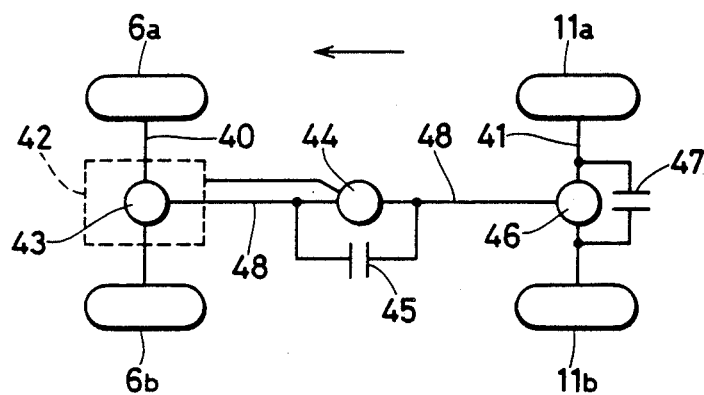
FIG. 5 is a schematic view of a drive system of the vehicle or automobile with the first embodiment.

FIG. 5 shows an embodiment of the present invention that is applicable to vehicles having four-wheel drive (4WD). In FIG. 5, driving power of an engine 42 is transmitted to a front wheel axle 40 (front wheels 6a, 6b shown in FIG. 1, are associated at both ends) through a center differential 44, a center shaft 48 and a front differential 43. Further, the driving power of the engine 42 is transmitted to a rear wheel axle 41 (rear wheels 11a and 11b are associated at both ends) through the center differential 44, the center shaft 48 and a rear differential 46. Lock apparatuses 45 and 47 are connected in parallel with the center differential 44 and the rear differential 46. To facilitate understanding, the parallel connections are shown. However, the differentials may contain the lock apparatuses.

The lock apparatuses 45 and 47 are, for example, a viscous coupling or an LSD (Limited Slip Differential). As is well known, when the rotational torque difference becomes larger than a predetermined value between the right and left wheels or between the wheels of the front and rear axles, some rotational torque is transmitted to the net having smaller rotational torque from the net having larger rotational torque. Or a torque in proportion to the rotational torque difference is transmitted to the other.

Next, there will be described operations of the above described anti-skid apparatus. Assume now that both of the conduit systems are in order, and the wheels 6a, 6b, 11a and 11b run on a road which is uniform in frictional coefficient. Suppose the vehicle driver treads the brake pedal 2. At the beginning of braking, the control signals Sa and Sb are "0" from the control unit 31. Accordingly, the valve devices 4a and 4b are in the A-position. Pressurized fluid is supplied from the master cylinder 1 to the wheel cylinders 7a and 7b of the front wheels 6a and 6b through the conduits 3 and 16, the valves devices 4a and 4b and the conduits 5 and 17. Pressurized fluid is also supplied to the wheel cylinders 12a and 12b of the rear wheels 11a and 11b through the conduits 13 and 15 and the proportioning valves 32a and 32b. Thus, the wheels 6a, 6b, 11a are braked.

When the deceleration or slip ratio of the wheels 6a, 6b, 11a and 11b becomes higher than the predetermined deceleration or slip ratio with the increase of the brake fluid pressure, the control signals Sa and Sb achieve the high level "1" or the middle level "½". The solenoid portions 30a and 30b are energized.

Although operations of the control unit 31 according to this invention will be described hereinafter, first operations of the valve apparatus will be described when the control signals Sa and Sb="1" and "½".

When the control signals Sa and Sb become "1", the valves 4a and 4b take the third position C. The conduits 3 and 16 are disconnected from the conduits 5 and 17, respectively. However, the conduits 5 and 17 are connected to the conduits 60a and 60b. The pressurized fluid is discharged from the wheel cylinders 7a and 7b of the front wheels 6a and 6b into the hydraulic reservoirs 25a and 25b through the conduits 5, 17, 60a and 60b. The pressurized fluid from the wheel cylinders 12a and 12b of the rear wheels 11a and 11b is discharged through the conduits 15 and 13 and the conduits 17, 5, 60b and 60a, into the hydraulic reservoirs 25a and 25b. Thus, the brakes of the wheels 6a, 6b, 11a and 11b are relieved.

When the control signals Sa and Sb are at the middle level "½", the valves 4a and 4b take the second position B. The conduits 3 and 16 are interrupted from the conduits 5 and 17. Further, the conduits 5 and 17 are disconnected from the conduits 60a and 60b. Thus the brake fluid pressures of the wheel cylinders 7a, 7b, 12a and 12b are maintained constant. The fluid pressure pumps 20a and 20b continue to supply brake fluid toward the conduits 3 and 16.

When the skid conditions of the wheels 6a, 6b, 11a and 11b are relieved, the control signals Sa and Sb again reach the low level "0". The valves 4a and 4b take the position A. The master cylinder side is connected to with the wheel cylinder side. The braking forces to the wheels 6a, 6b, 11a and 11B again increase.

Hereafter, the above-described operations are repeated. When the running speed of the vehicle reaches the desired speed, or when the vehicle stops, the brake pedal 2 is released. The brake fluid is returned from the wheel cylinders 7a, 7b, 12a and 12b to the master cylinder 1 through the conduits, the valves 4a and 4b, the check valves 19a and 19b. Thus, the brake is relieved.

In the above description, the control signals Sa and Sb become "0", "1" or "½" at the same time. However, when the frictional coefficients of the road are considerably different at the right and left sides, the control signals Sa and Sb do not become "0", "1", or "½" at the same time. For example, when the frictional coefficient of the right side of the road is relatively small, the control signal Sa first becomes "1". Such a case will be described next.

The operations at the beginning of the braking are as described above. When the control signal Sa becomes "1", the valve 4a takes the position C. Pressurized fluid is discharged into the reservoir 25a from the wheel cylinders 7a and 12b. On the other hand, the brake fluid continues to be supplied to the wheel cylinders 7b and 12a from the master cylinder 1.

When the control signal Sa becomes "½", the fluid pressures of the wheel cylinders 7a and 12b of the front and rear wheels 6a and 11b are kept constant. And when the other control signal Sb is still "0", the fluid pressure of the wheel cylinder 7b of the other front wheel 6b continues to rise.

When the brake fluid pressure of the right front wheel 6a is lowered, that of the left rear wheel 11b of the same conduit system is lowered, too. Accordingly, the wheel speed of the left rear wheel 11b increases. On the other hand, the brake fluid pressure of the right rear wheel 11a is increasing with that of the left front wheel 6b of the same conduit system. Accordingly, the right rear wheel 11a tends to lock. However, when the rotational torque difference becomes larger than the predetermined value between the rear wheels 11a and 11b, some rotational torque is transmitted to right rear wheel 11a from the left rear wheel 11b of the larger rotational torque through the lock apparatus, and so the wheel speed of the right rear wheel 11a rises. Accordingly, the right rear wheel 11a is prevented from locking.

Next, operations of the control unit 31 according to this invention will be described. First, assume that the frictional coefficient of the right side is smaller (low side). The brake pedal 2 is depressed. At time t1, the right rear wheel 11a reaches the predetermined deceleration, and so the signal $-b$ is generated from the deceleration signal generator corresponding to the deceleration signal generator 63a of FIG. 2 in the judge circuit for the right rear wheel 11a. Although FIG. 2 shows the judge circuit for the right front wheel 6a, the same reference symbols will be hereinafter used for the corresponding elements or circuit blocks for the convenience of the description.

The signal $-b$ is supplied to the OR gate 71a, and the movable contact of the changeover circuit 70a is changed over to the output side of the multiplier 67 by the output of the OR gate 71a. The signal $-b$ is further supplied to the second input terminal of the OR gate 82a. The output of the OR gate 82a generates the output signal EVHR through the AND gates 83a and 84a, and also the output signal EAHR through the OR gate 85a.

As shown in FIG. 6(A), the signal EAHR becomes "1" at time t1. In FIG. 3, the $Q_1$ and $Q_2$ outputs of the flip-flops 59a and 59b are "1", and the signal EVHR is now supplied to the AND gate 52. Accordingly, the output b of the AND gate 52 becomes "1", and so both of the outputs d and f of the OR gate 54 and AND gate 55 become "1". Thus, the signal EVH becomes "1". Thus, at time t1, the outputs b, d and f become "1", as shown in FIG. 6(P), (R) and (T) respectively. Accordingly, the output g of the OR gate 57 becomes "1". Thus, the signal EAH becomes "1", in FIG. 3.

Figure 3:
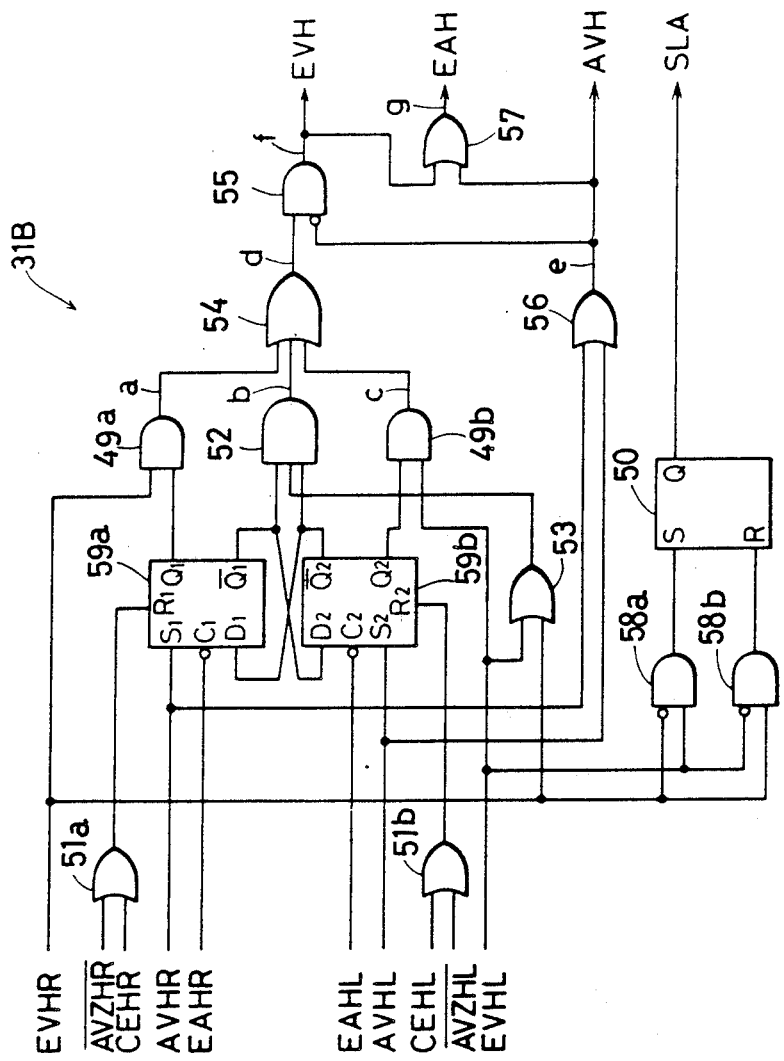
FIG. 3 is a circuit diagram of a selection part in FIG. 1.

Further, in FIG. 3, the signal EVHR is supplied to the AND gates 58a and 58b. Since the signal EVHL is still "0", the output of the AND gate 58b becomes "1", while that of the other AND gate 58a remains "0". Accordingly, the signal SLA remains "0". The right side of the road is judged to be "low side" as a result.

Figure 4:
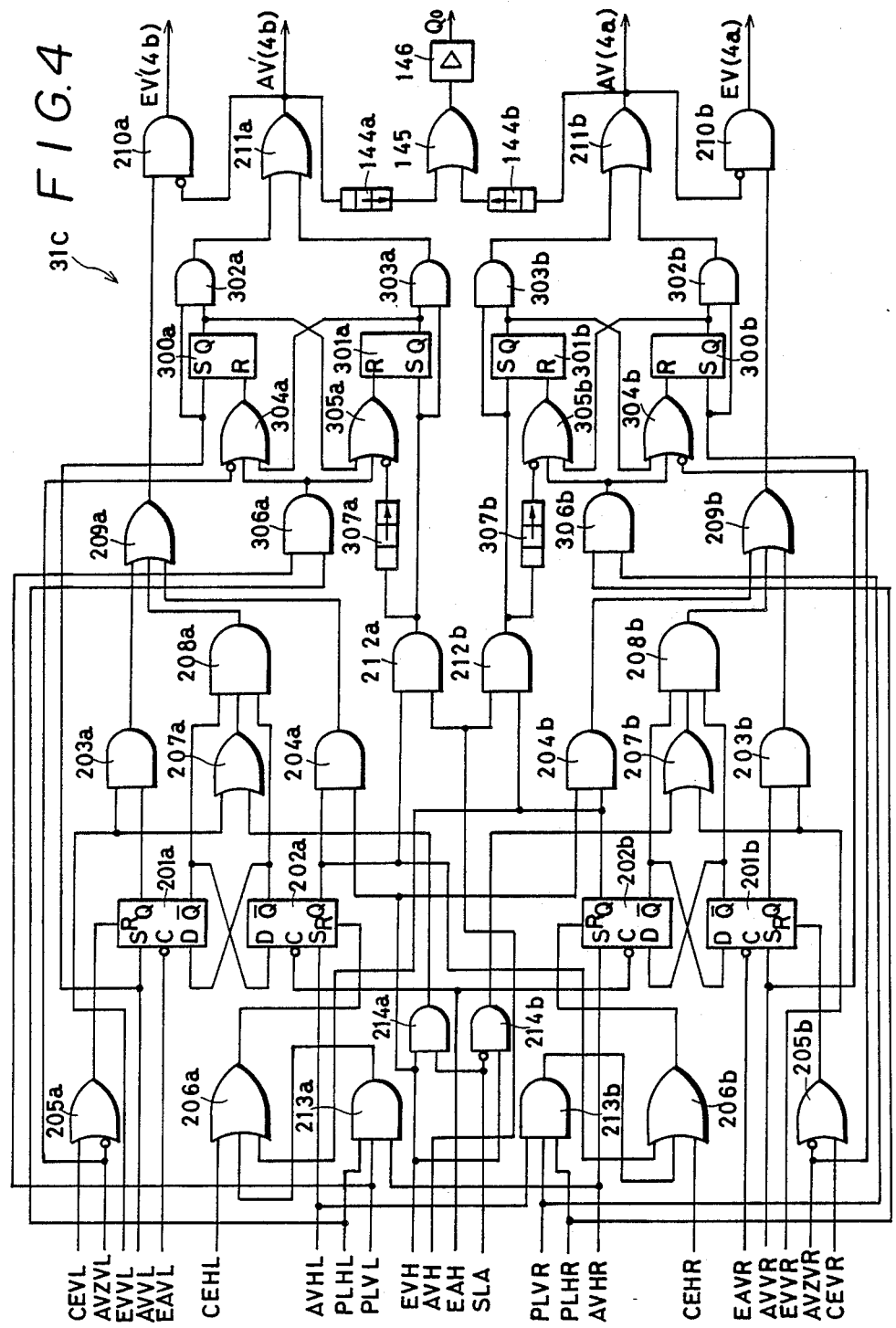
FIG. 4 is a circuit diagram of a logic part in FIG. 1.

In FIG. 4, the signal EVH is supplied to the one input terminal of the AND gate 204a. However, since the Q output of the flip-flop 202a to the other input terminal of the AND gate 204a is still "0", the output of the AND gate 204a is "0". The signal EVH is also supplied to the input terminal of the AND gate 204b. However, since the Q output of the flip-flop 202b is also "0", the output of the AND gate 204b is "0".

The signal EAH is supplied to the negation clock terminals C of the flip-flops 202a, 202b. However, since it is negated, the Q outputs of the flip-flops 202a, 202b remain "0".

The signal SLA is supplied to the AND gates 214a, 214b, and it is now "0". The negated signal SLA is supplied to the one AND gate 214b. Accordingly, the output of the AND gate 214b becomes "1", and therefore, the output of the OR gate 207b becomes "1". The input to the second input terminal of the AND gate 208b becomes "1". Since the $\overline{Q}$ outputs of the flip-flops 201b, 202b are "1", the output of the AND gate 208b becomes "1". The output of the OR gate 209b, therefore that of the AND gate 210b, becomes "1". Thus, the output signal EV becomes "1". Accordingly, the control signal Sa of the current level "½" is supplied to the solenoid portion 30a of the change-over valve 4a. Thus, the braking forces to the right front wheel 6a and rear wheels 11a, 11b are maintained constant. The lock apparatus 47 functions.

Figure 6:
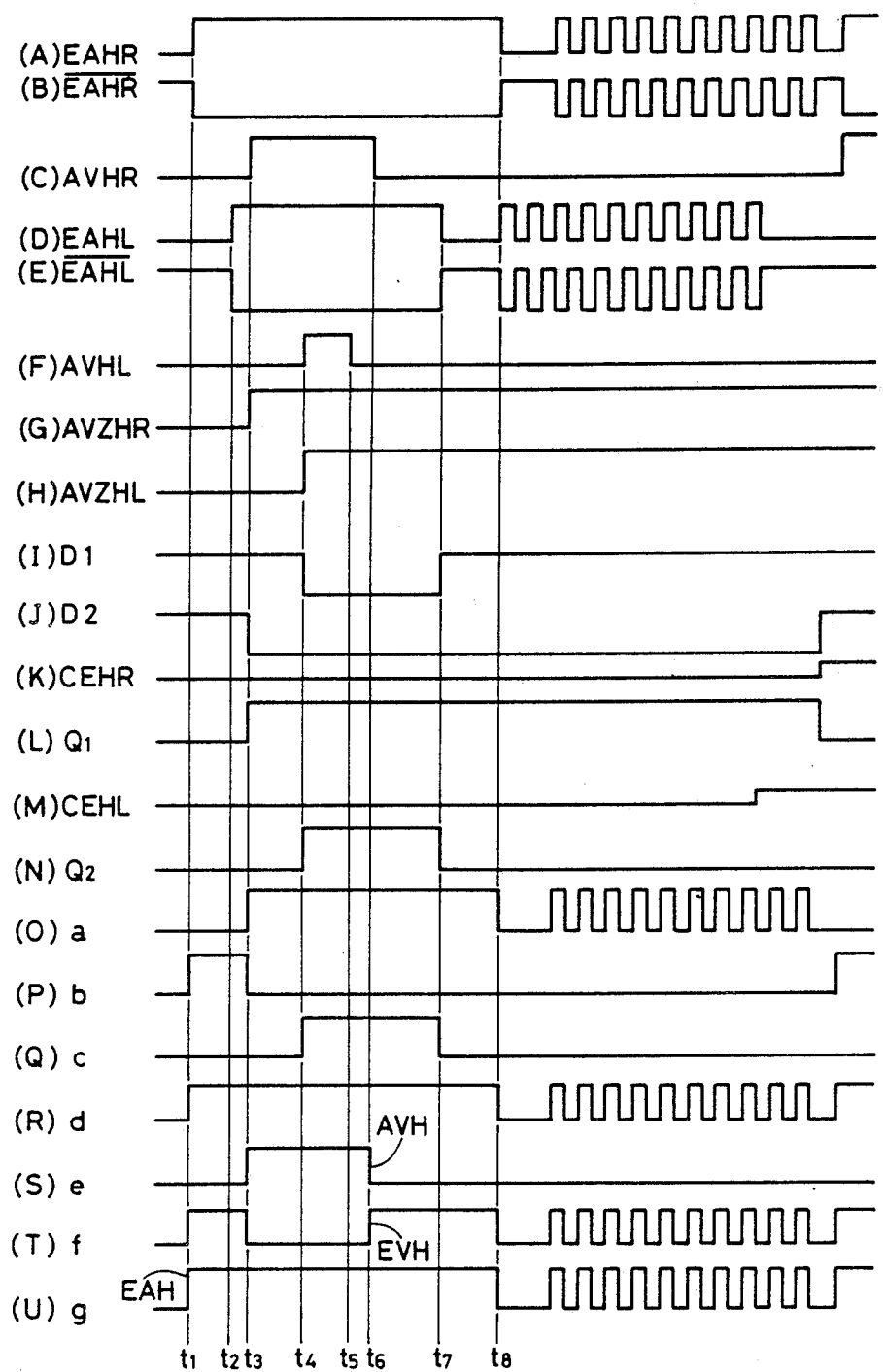
FIG. 6 is a set of graphs for explaining operations of the first embodiment of this invention.

At time t2, the rear wheel 11b on the "high side" of the road reaches the predetermined deceleration. The signal EVHL, and thus EAHL is generated, as shown in FIG. 6 (D). It is supplied to the other input terminal of the OR gate 53. The signal EVHR is already supplied to the other input terminal of the OR gate 53. Since it is maintained, the output of the OR gate 53, therefore, that b of the AND gate 52, that d of the OR gate 54, and the output signals EVH, EAH are unchanged as "1", as shown in FIG. 6 (D) (R) (T) (U). The output of the AND gate 58b becomes "0". However, the output of the other AND gate 58a remains "0". Accordingly, the Q output of the flip-flop 50 remains "0". Thus, the right side of the road is determined to be the "low side".

At time t3, the right rear wheel 11a generates the signal AVHR as shown in FIG. 6(C). It reaches the predetermined slip. The slip signal $\lambda$ is generated from the slip signal generator 72a of the judge circuit for the right rear wheel 11a. It is supplied to the one input terminal of the AND gate 73a. Since the first acceleration signal $+b_1$ is not generated, the output of the AND gate 73a becomes "1". Thus, the signal AVHR is generated. At the same time, the output of the AND gate 84a or signal EVHR becomes "0". However, the output of the OR gate 85a or the signal EAHR continues to be "1", as shown in FIG. 6(A). In FIG. 3, the signal SLA remains "0".

In FIG. 2, the slip signal is supplied to the OFF delay timer 86a. The output of the OFF delay timer 86a is supplied to the one input terminal of the AND gate 75a. Accordingly, hereinafter when the deceleration signal $-b$ is generated, the output of the AND gate 75a, and thus that of the OR gate 76a, becomes "1". Thus the signal AVHR is generated. In addition after the signal $-b$ disappears, the output of the OFF delay timer 77a connected to the output terminal of the AND gate 75a is maintained at the level "1" for the delay time of the OFF delay timer 77a.

The output of the OR gate 76a is supplied to the OFF delay timer 86a. Accordingly, the signal AVZHR is generated as shown in FIG. 6. In FIG. 4, the motor drive signal Qo is generated from the amplifier 146. The motor 22 of FIG. 1 starts to be driven.

In FIG. 3, the signal AVHR is supplied to the set terminal $S_1$ of the flip-flop 59a. Its Q1 output becomes "1" and its $\overline{Q_1}$ output becomes "0". Accordingly, the input to the data terminal D2 of the other flip-flop 59b becomes "0" as shown in FIG. 6. The output of the OR gate 56, therefore the signal AVH, is generated as shown in FIG. 6(S). The signal EVH becomes "0". However, the signal EAH continues to be "1" as shown in FIG. 6(U).

In FIG. 4, the signal AVHR is supplied to the set terminals of the flip-flop 202b. The Q output thereof becomes "1", and it is supplied to the one input terminal of each of the AND gates 204b and 212b. The input signal EVH to the other input terminal of the AND gate 204b is "0", while the input signal AVH to the other input terminal of the AND gate 212b is "1". Accordingly, the output of the AND gate 204b remains "0", while that of the AND gate 212b becomes "1". The output signal AV is obtained. Thus, the control signal Sa of the current level "1" is supplied to the solenoid portion 30a of the changeover valve 4a in FIG. 1. Thus, the brakes of the right front wheel 6a and rear wheel 11b are relieved. The Q output of the one flip-flop 202b is "1", while that of the other flip-flop 202a is "0". Now the right side of the road is judged to be "low side".

Hereafter, even when the right front wheel 6a generates the brake relieving signal AVVR, the Q output of the second flip-flop 300b does not becomes "1" as long as the fourth flip-flop 301b is not reset. In other words, the brake relieving signal is formed in accordance with the skid condition of the one or ones of the rear wheels both 11a, 11b and front wheel 6a on the low side which has generated the brake relieving signal sooner than the other or others. In this embodiment, even when the front wheel 6a generates the brake relieving signal AVVR later, the brake of the conduit system of the front wheel 6a is not relieved with the brake relieving signal AVVR, so long as the flip-flop 301b is not reset. On the other hand, the first flip-flop 301b is put into the set condition, and so its Q output becomes "1". Before the front wheel 6a generates the brake relieving signal AVVR or during the time when it generates the brake relieving signal AVVR, the front wheel 6a reaches the predetermined deceleration and so the deceleration signal −b is generated from the deceleration signal generator 63a. Accordingly, when the brake relieving signal AVVR vanishes, the signal EVVR is generated, and it is supplied to the AND gate 203b. Its output becomes "1", and so that of the OR gate 209b becomes "1". However, since the output of the OR gate 211b is now "1", the output of the output stage AND gate 210b does not become "1". The brake continues to be relieved.

At time t4, the other rear wheel 11b reaches the predetermined slip during the continuation of the signal AVHR as shown in FIG. 6(C). Thus, the signal AVHL is generated as shown in FIG. 6(F). In FIG. 3, it is supplied to the set terminal S2 of the flip-flop 59b. Accordingly, the Q2 output thereof becomes "1" and the $\overline{Q2}$ output thereof becomes "0". Thus, the input to the data terminal D1 of the flip-flop 59a becomes "0" as shown in FIG. 6(I).

The signal AVHL is also supplied to the one input terminal of the OR gate 56. Since the signal AVHR continues to be supplied to the other input terminal of the OR gate 56, the signal AVH remains "1". In FIG. 4, the signal AVHL is supplied to the set terminal S of the flip-flop 202a. However, since the Q output of the flip-flop 202b is supplied through the OR gate 206a to the reset terminal R of the flip-flop 202a, the Q output of the flip-flop 202a remains "0" due to the reset priority. Thus, the output of the AND gate 212a remains "0". The output signal AV for the left side is not generated. The brake of the left front wheel 6b is not relieved. However, when the left front wheel 6b generates the signal AVVL, it is independently controlled for brake relief, since the signal AVVL is supplied to the second flip-flop 300a, and its Q outut is supplied to the OR gate 211a. Thus, the braking distance can be much shortened with the arrangement of this embodiment of the invention.

At time t5, the signal AVHL becomes "0". However, this has no influence on the other signals. At time t6, the slip signal λ of the right rear wheel 11a disappears. Accordingly, the signal AVHR becomes "0" as shown in FIG. 6(C). In FIG. 2, the input to the one input terminal of the OR gate 85a becomes "0". However, after the signal −b disappears, the output of the OR gate 82a is still "1" because of the delay time of the OFF delay timer 77a. Accordingly, the output of the AND gate 84a, therefore the signal EVHR again becomes "1" with the disappearance of the signal AVHR. The output to the OR gate 85a, therefore the signal EAHR, continues to be "1" as shown in FIG. 6(A).

In FIG. 3, the signal AVHR becomes "0". However, since the output of the OR gate 51a is still "0", the flip-flop 59a is not reset, but its Q output remains "1" as shown in FIG. 6(L). The signal EVHR is still "1". Accordingly, the output a of the AND gate 49a remains "1", as shown in FIG. 6(O). The output e of the OR gate 56 becomes "0". Accordingly, the output f of the AND gate 55, therefore the signal EVH, again becomes "1" from "0" as shown in FIG. 6(T). The output signal EAH of the OR gate 57 remains "1".

In FIG. 4, the input to the set terminals of the flip-flop 202b becomes "0". However, since the input to the reset terminal R thereof is "0", its Q output remains "1". Since the signal EVH again becomes "1", the output of the AND gate 204b, therefore that of the OR gate 209b, becomes "1". On the other hand, the input AVH to the one input terminal of the AND gate 212b becomes "0". Accordingly, its output becomes "0", and the output signal AV disappears. With the disappearance of the output signal AV, the other output signal EV becomes "1". In FIG. 1, the changeover valve 4a is changed over to the position B, and the braking forces to the right front wheel 6a and the rear wheels 11a and 11b are maintained constant.

In FIG. 2, when the deceleration signal −b disappears, and the delay time of the OFF delay timer 77a lapses, the input to the fourth input terminal of the OR gate 82a becomes "0". However, it is assumed that the left rear wheel 11b reaches the predetermined first acceleration before the lapse of the delay time of the OFF delay timer 77a. Accordingly, the input to the first input terminal of the OR gate 82a becomes "1", and the signal EAHL continues to be "1" as shown in FIG. 6(D), as long as the first acceleration signal $+b_1$ is generated, although the output of the OFF delay timer 77a becomes "0". At time t7 when the first acceleration signal $+b_1$ disappears, the signal EAHL becomes "0".

In FIG. 3, the input to the clock terminal C2 of the flip-flop 59b becomes "0". It is inverted or negated and supplied to the clock terminal C2. The input "0" is supplied to the data terminal D2, and it is read out with the negated input to the clock terminal C2. Thus, the Q2 output becomes "0" as shown in FIG. 6(N). Accordingly, the $\overline{Q2}$ output becomes "1". The $\overline{Q1}$ output of the other flip-flop 59a remains "0". Accordingly, the output b of the AND gate 52 remains "0". The output c of the AND gate 49b becomes "0" with the disappearance of the Q2 output of the flip-flop 89b, as shown in FIG. 6(Q).

On the other hand, the Q1 output of the flip-flop 59a remains "1", and the right rear wheel 11a still generates the signal EVHR. Accordingly, the output a of the AND gate 49a continues to be "1", and the signal EVH remains "1" as shown in FIG. 6(T).

In FIG. 2, as soon as the first acceleration signal +b₁ disappears, the pulse generator 80a is driven for the delay time of the OFF delay timer 131a. The signal EAHL, and $\overline{EAHL}$ become rectangular waves of opposite senses as shown in FIGS. 6(D) and 6(E), from time t8. In FIG. 3, the one input to the OR gate 53 and the one input to the AND gate 49b are pulsed on and off. However, the Q2 output of the one flip-flop 59b is "0", and the Q1 output of the other flip-flop 59a is "0". Accordingly, the output EAH of the OR gate 57, and the output EVH of the AND gate 55 are not pulsed between "0" and "1", but they continue to be "1" with the signal EVHR. Accordingly, the braking forces to the right front wheel 6a and rear wheels 11a, 11b are still maintained constant.

When the right rear wheel 11a generates the first acceleration signal +b₁ after time t7, the signal EVHR and EAHR continue to be "1" due to the delay time of the OFF delay timer 77a. The braking forces to the right front wheel 6a and rear wheels 11a, 11b are still maintained constant. However, at time t8 when the first acceleration signal +b₁ disappears, the pulse generator 80a is driven, and the signal EAHR is cycled as shown in FIG. 6(A). Thus, in FIG. 3, the signals EVH and EAH are cycled on and off.

Accordingly, in FIG. 4, the output of the AND gate 204b is a square wave.

The braking forces to the right front wheel 6a and rear wheels 11a and 11b are increased in steps.

However, before that stepwise braking, the right front wheel 6a generates the first acceleration signal +b₁ and the signal EVVR cycles on and off with the disappearance of the first acceleration signal +b₁. The output of the AND gate 203b changes between "0" and "1". Since the signal EVH, which continues to be "1", is supplied to the first input terminal of the OR gate 209b, the output of the OR gate 209b remains "1", and so the brake continues to be maintained constant.

The slow braking operation is effected by the stepwise braking application, and it is effected in accordance with the skid condition of the one or ones of the rear wheels 11a and 11b and right front wheel 6a which generates the slow brake pressure increasing instruction later than the other or others. It does not depend on the skid condition of the other or others of the rear wheels 11a and 11b and right front wheel 6a which generates the slow brake pressure increasing signal sooner than the one or ones, but the braking force remains constant.

When the counted pulses reach the predetermined value, the output CEHR of the counter 88a (in FIG. 2) in the judge circuit for the right rear wheel 11a becomes "1". Accordingly, in FIG. 4, the input of the third input terminal of the OR gate 206b becomes "1". The output of the OR gate 206b is supplied to the reset terminal R of the flip-flop 202b to reset it, and its Q output becomes "0". Although the pulses continue, the stepwise increase of the braking forces is stopped. When the Q output of the flip-flop 202b becomes "0", the other flip-flop 202a is released from the reset condition.

Hereafter, if the right side of the road is still the "low side", the above operations are similarly repeated. When the "low side" is inverted on the road, or when the left side of the road becomes "low side", operations similar to the above described operations for the right front wheel 6a and both rear wheels 11a and 11b are effected for the left front wheel 6b and both rear wheels 11a and 11b.

Further the "low side" is so designed as to be changed over in the case when the rear wheel 11b running on the "high side" generates the brake relieving signal or pressure decreasing signal AVHL while both of the braking forces to the front and rear wheels 6a and 11a, are increased stepwise. In FIG. 4, while the signals PLVR and PLHR (outputs of the pulse generators 80a) are pulsed alternately the signal AVHL becomes "1". The output of the AND gate 213b, therefore that of the OR gate 206b, becomes "1", and this output is supplied to the reset terminal R of the flip-flop 202b. The Q output thereof becomes "0". Accordingly, the output of the OR gate 206a becomes "0", and the input to the reset terminal R of the flip-flop 202a becomes "0". On the other hand, the signal AVHL is supplied to the set terminals of the flip-flop 202a. The Q output thereof becomes "1". Thus, the "low side" is changed over.

Figure 7:
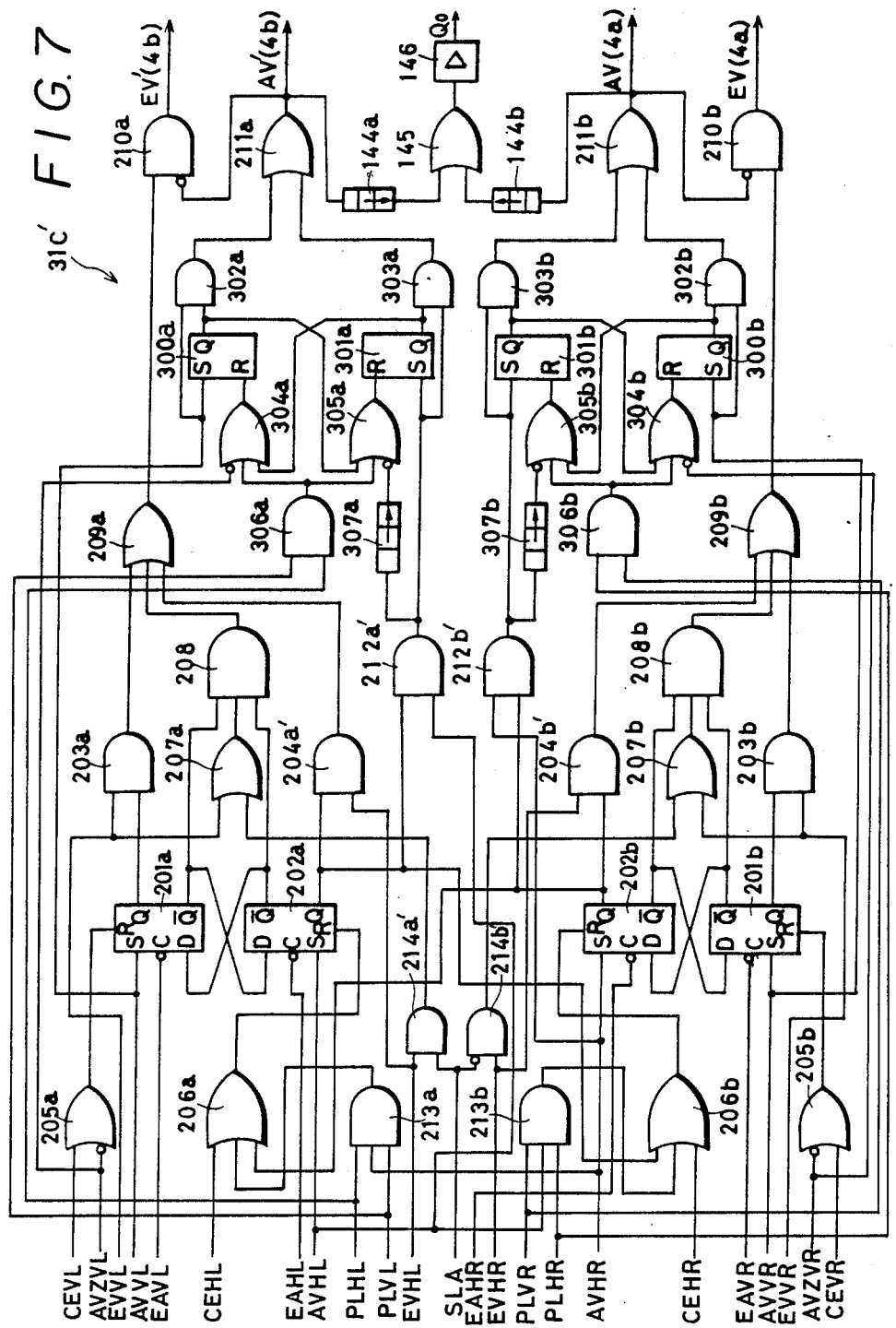
FIG. 7 is a circuit diagram of a control unit in a second embodiment of this invention.

FIG. 7 shows a circuit of a logic part 31C' of a control unit in a second embodiment of this invention. Its judge part is the same as the judge part 31B of the first embodiment. In the slection part, details are omitted the circuits except the circuit for forming the signal SLA. A conduit system is the same as that of the first embodiment shown in FIG. 1.

In the first embodiment, the first select-low control signal is formed from the judging results of both of the rear wheels 11a and 11b, and the second select-low control signal is formed from the first select-low control signal and the judging result of the front wheel on the low side. However, in the second embodiment, a select-low control signal is formed from the judging results of the front and rear wheels on the low side.

Parts in FIG. 7 which correspond to those in FIG. 4, are denoted by the same reference numerals, the description of which will be omitted.

In this embodiment, the outputs EVHL, AVHL, EAHL and EVHR, AVHR and EAHR, as the judging results of the rear wheels 11a and 11b in the judge part 31A, are supplied to the logic part 31C' instead of the outputs EVH, AVH and EAH (first select-low control signal) of the selection part 31B as in the first embodiment.

The outputs EVHL and EVHR are supplied to one input terminal each of AND gates 214a and 213b, respectively. The signal SLA is supplied to other input and negation input terminals thereof. The outputs EVHL and EVHR are further supplied to input terminals of AND gates 204a', 204b'. The Q output terminals of the flip-flop 202a and 202b are connected to other input terminals of the AND gates 204a' and 204b'.

The outputs AVHL and AVHR are supplied to input terminals of AND gates 212a' and 212b', respectively. The Q output terminals of the flip-flop 202a and 202b are connected to other input terminals of the AND gates 212a' and 212b'.

The outputs EAHL and EAHR are supplied to the negation clock input terminals of the flip-flops 202a and 202b.

In the descriptions of the operations of the second embodiment, the select-low control signals EVH, AVH and EAH of the rear wheels 11a and 11b may be substituted for the outputs EVHL, AVHL and EAHL or EVHR, AVHR and EAHR from the rear wheel on the low side. Accordingly, the descriptions of the operations will be omitted.

Figure 8:
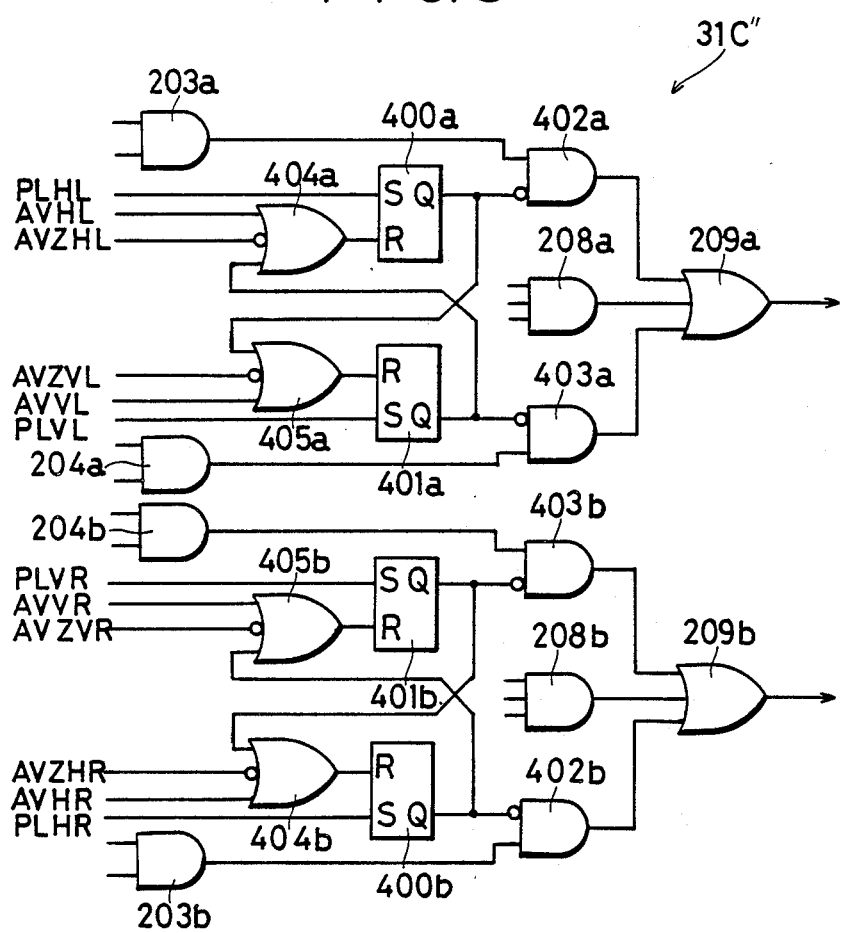
FIG. 8 is a circuit diagram of an important part of a control unit in a third embodiment of this invention.

FIG. 8 shows an important part of a logic part 31C″ of a control unit according to a third embodiment of this invention. The other circuit is equal to the circuit of the first embodiment as shown in FIG. 4. In this embodiment, the circuit shown in FIG. 8 is added between the AND gates 203a, 203b, 204a and 204b and the OR gates 209a and 209b as shown in FIG. 4.

In FIG. 8, the output terminals of the AND gates 203a and 203b are connected to one input terminals of the AND gates 402a and 402b. Q output terminals of fifth flip-flops 400a and 400b are connected to other negation input terminals of the AND gates 402a and 402b. Output terminals of the gates 402a and 402b are connected to first input terminals of OR gates 209a and 209b.

The signals PLHL and PLHR are supplied to set terminals S of the fifth flip-flops 400a and 400b. Output terminals of OR gates 404a and 404b are connected to reset terminals R of the flip-flops 400a and 400b. The signals AVHL, AVHR, AVZHL and AVZHR are supplied to the first input terminals of the OR gates 404a and 404b and the second negation input terminals of the OR gates 404a and 404b, respectively.

Output terminals of the AND gates 204a and 204b are connected to input terminals of AND gates 403a and 403b, while Q output terminals of sixth flip-flops 401a and 401b are connected to other negation input terminals of the AND gates 403a and 403b. Output terminals of the gates 403a and 403b are connected to third input terminals of the OR gates 209a and 209b.

The signals PLVL and PLVR are supplied to set terminals S of the sixth flip-flops 401a and 041b. Output terminals of the OR gates 405a and 405b are connected to reset terminals R of the flip-flops 401a and 401b. The signals AVVL, AVVR, AVZVL and AVZVR are supplied to the first input terminals of the OR gates 405a and 40tb and the second negation input terminals thereof respectively. Q outputs of the sixth flip-flops 401a and 401b are supplied to the third input terminals of the OR gates 404a and 404b. Q outputs of the fifth flip-flops 400a, 400b are supplied to the third input terminals of the other OR gates 405a and 405b. The fifth and sixth flip-flops 400a and 400b and 401a and 401b are the RS flip-flops of the reset priority type.

In the first and second embodiment, the brake is slowly increased in accordance with the skid condition of the one or ones of the rear wheels both and the front wheel on the low side or of the one of the rear and front wheels on the low side which generates the slow brake increasing signal later than the other or the others. However in this embodiment, it is slowly increased in accordance with the skid condition of the wheel which generates the slow brake increasing signal sooner than the other.

It is now assumed that the right side is the low side and the front wheel 6a has generated the slow brake increasing signal PLVR. At that time, the Q output of the sixth flip-flop 401b becomes "1" and so the output of the AND gate 204b is prohibited from passing through the AND gate 403b. The Q output thereof resets the fifth flip-flop 400b. Accordingly, the Q output of the flip-flop 400b becomes "0" and the AND gate 402b is opened. The output of the AND gate 203b or the EVVR which now changes as "0" "1" "0" "1" passes through the AND gate 402b. Thus, the front wheel 6a and the rear wheels 11a and 11b are braked in steps. Hereafter, even when the select-low signal EVH of the rear wheels 11a and 11b cycles off and on, the AND gate 403b prohibits the signal EVH from passing. Thus in this embodiment, the brake is slowly increased in accordance with the skid condition of the one of the front wheel on the low side and the rear wheels which approach the skid condition to slowly increase the braking force, sooner than the other.

When the front wheel 6a again generates the brake relieving signal AVVR, the sixth flip-flop 401b is reset. In order to reset the flip-flops 400a, 400b, 401a and 401b at the initial stage of the control, the negation of the signals AVZHL, AVZVL, AVZVR and AVZHR are supplied to the OR gates 404a, 405a, 404b and 405b, respectively.

In FIG. 8, the signals PLHL, PLVL, PLVR and PLHR are supplied to the set terminals S of the flip-flops 400a, 400b, 401a and 401b to set them, and to put the mated flip-flops into the reset condition. Accordingly, the brake is slowly increased in accordance with the skid condition of the one or ones of the front wheel on the low side and the rear wheels both which generates the slow brake increasing signal sooner than the other or others. However, the signals representing the stable region of the $\mu$-slip characteristic may be used instead of the signals PLHL, PLVL, PLVR and PLHR.

The definition of "the stable region of the $\mu$-slip characteristics" is described, for example, in the "Theses of Automobile Technology Society," page 133, No. 31, 1985. The "stable region" means that the wheel is rotating at smaller slip rates than the slip rate at the maximum of $\mu$-value (frictional value) in the slip rate-frictional coefficient $\mu$ characteristics. According to this embodiment, the signals PLHL, PLVL . . . are used as the signals representing "stable region".

Figure 9:
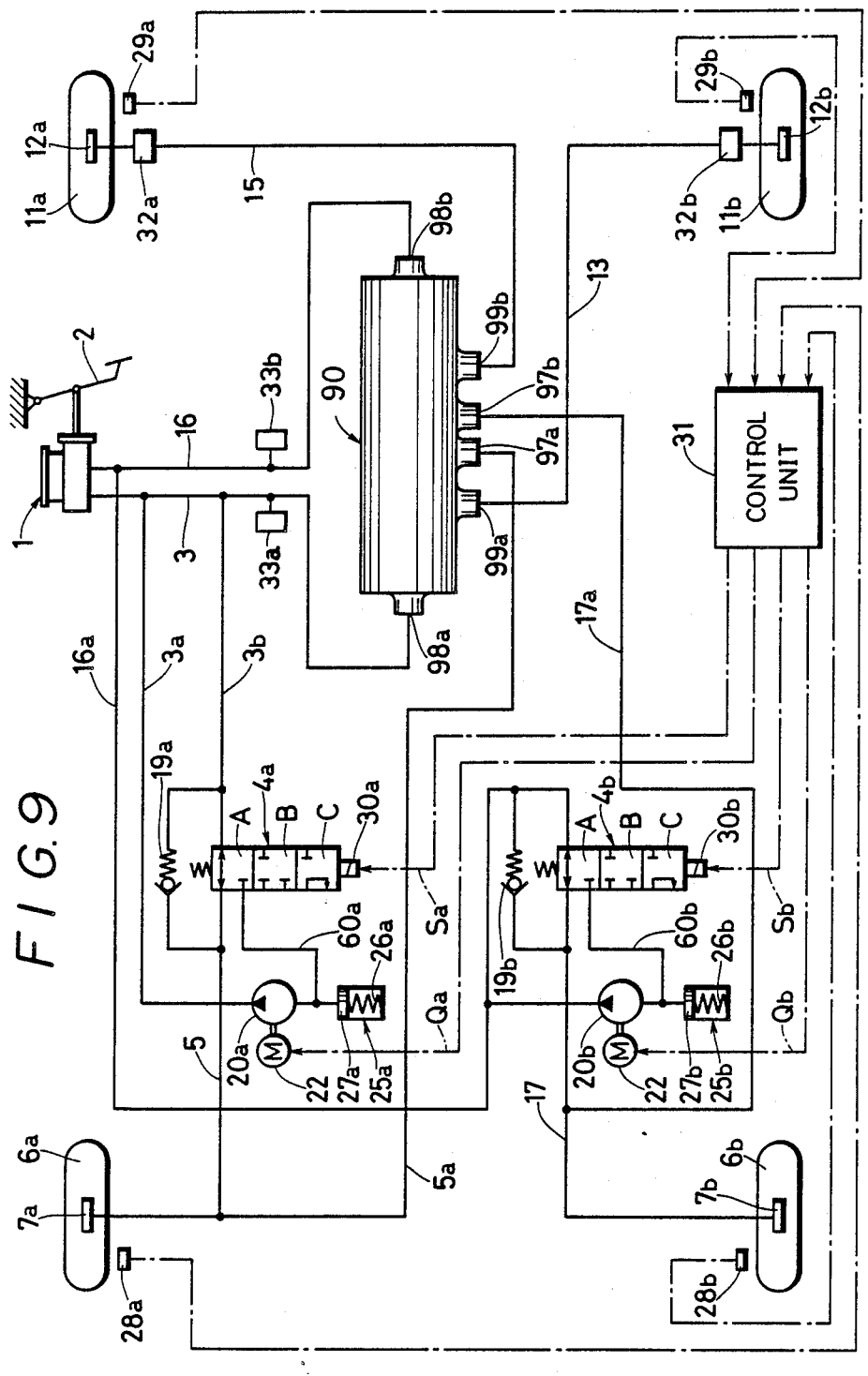
FIG. 9 is a schematic view of an anti-skid control apparatus according to a fourth embodiment of this invention.

Next, an anti-skid control apparatus according to a fourth embodiment of this invention will be described with reference to FIG. 9 and FIG. 10. Parts in FIG. 9 which correspond to those in FIG. 1 are denoted by the same reference numerals, the description of which will be omitted.

In this embodiment, a valve apparatus 90 is arranged between the wheel cylinders 7a and 7b of the front wheels 6a and 6b and cylinders 12a and 12b of the rear wheels 11a and 11b. Further, the pumps 20a and 20b and motors 22a, 22b are separately shown in FIG. 9 respectively. However, they are equal to those shown in FIG. 1 in which they are single.

Next, the details of the valve apparatus 90 will be described with reference to FIG. 10.

Figure 10:
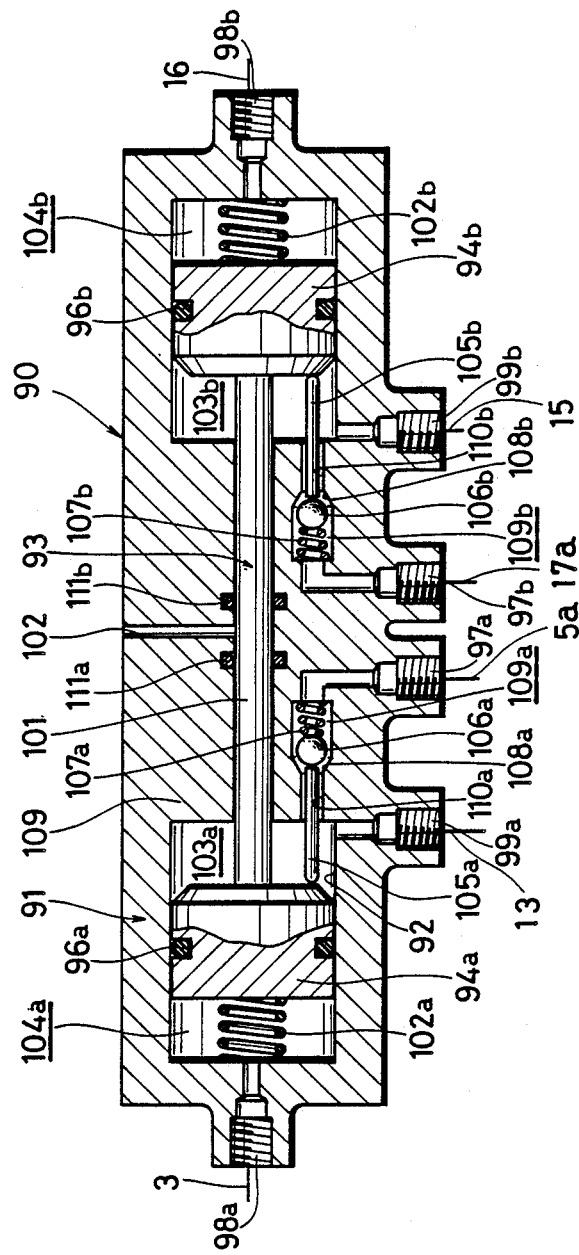
FIG. 10 is an enlarged cross-sectional view of a valve apparatus of FIG. 9.

In FIG. 10, an axial through hole 92 is made in a casing 91 for a valve apparatus 90. A piston group 93 consisting of three members is slidably fitted to the stepped hole 92. The three members are a pair of larger-diameter pistons 94a and 94b and a smaller-diameter piston 101. The larger-diameter pistons 94a and 94b are provided with seal rings 96a and 96b. Output chambers 103a and 103b are formed at the insides of the larger-diameter pistons 94a and 94b. Master cylinder pressure chambers 104a and 104b are formed at the outsides of the larger-diameter pistons 94a and 94b. The smaller-diameter piston 101 is slidably fitted to a central hole of a partition 109 of the casing 91, sealed with seal rings 111a and 111b. A space between the seal rings 111a and 111b communicates through a vent 102 with the atmosphere. The larger-diameter pistons 94a and 94b are urged inward by springs 102a and 102b which are equal to each other in spring force. Thus, the piston group 93 is normally located at the neutral position shown.

The master cylinder pressure chambers 104a and 104b, and the output chambers 103a and 103b communicate with the conduits 3 and 16, and 13 and 15 through connecting ports 98a and 98b, and output ports 99a and 99b, respectively.

Valve rods 105a and 105b are slidably fitted to axial holes 110a and 110b made in the partition 109 of the casing 91. Outer ends of the valve rods 105a and 105b contact with the inner surfaces of the larger-diameter pistons 94a and 94b. Inner end thereof contact with valve balls 106a and 106b urged by springs 107a and 107b. When the piston group 93 is located at the neutral position shown, the valve balls 106a and 106b are separated from valve seats 108a and 108b, as shown in FIG. 10. Valve chambers 109a and 109b in which the springs 107a and 107b are compressed, communicate with the conduits 5a and 17a through input ports 97a and 97b, respectively.

Next, there will be described operations of the above-described apparatus of the fourth embodiment. First, it is assumed that both of the two conduit systems are in order, and the right front and rear wheels 6a and 11a are running on the frictionally lower side of the road, as in the first embodiment.

When the valve 4a is changed over into the position C with the start of the skid control operation, the pressurized fluid is discharged from the wheel cylinder 7a of the right front wheel 6a into the reservoir 25a through the conduit 60a, while it is discharged from the wheel cylinder 12b of the left rear wheel 11b into the reservoir 25a through the conduit 13, the output port 99a of the valve apparatus 90, the space between the valve ball 106a and the valve seat 108a therein, the input port 97a thereof, and the conduits 5a and 60a. Thus, the brakes of the wheels 6a and 11b are relieved.

In the valve apparatus 90, the fluid pressure decreases in the one output chamber 103a while it still increases in the other output chamber 103b. Accordingly, the whole of the piston group 93 is moved to the right. The right valve rod 105b is moved to the right, and the valve ball 106b comes to contact with the valve seat 108b. Thus, the valve ball 106b closes. On the other hand, the left valve rod 105a is moved to the right, and the valve ball 106a is further separated from the valve seat 108a. Thus, the valve ball 106a is maintained at the open state.

The volume of the one output chamber 103b increases with the rightward movement of the piston group 93. Now the one output chamber 103b is interrupted from the wheel cylinder 7b of the left front wheel 6b. Accordingly, the fluid pressure of the wheel cylinder 12a of the right rear wheel 11a, communicating always with the one output chamber 103b, decreases with the increase of the volume of the chamber 103b. The other operations in the case that both of the two conduit systems are in order are the same as in the first embodiment.

The control unit 31 is equal to that of the first embodiment. The output signals Sa and Sb change in the same manner as those of the first embodiment. The piston groups 93 are moved to the right or left in accordance with the levels of the signals Sa and Sb. The brake pressure of the rear wheels 11a and 11b change in accordance with the lower one of the brake pressures of the front wheels 6a and 6b. When the valve apparatus 90 is used, both of the rear wheels can be prevented from locking.

Next, there will be described the case that one of the two conduit systems fails. For example, when brake fluid leaks from the one conduit system including the conduit 3, the fluid pressures of the wheel cylinders 7a and 12b do not increase by treading the brake pedal 2. On the other hand, the fluid pressure of the other conduit system including the conduit 16 increases by treading the brake pedal 2. Accordingly in the valve apparatus 90, the fluid pressure of the one master cylinder pressure chamber 104b rises, while that of the other master cylinder pressure chamber 104a remains zero. Thus, the fluid pressures to both sides of the one larger-diameter piston 94a of the piston group 93 are zero. Those to both sides of the other larger-diameter piston 94b of the piston group 93 are not zero, and are substantially equal to each other. As a result, the piston group 93 is not moved, and remains located at the neutral position shown. Accordingly, the valve ball 106b remains separated from the valve seat 108b.

Thus, in the right conduit system, the pressurized fluid is supplied from the master cylinder 1 into the wheel cylinder 7b of the left front wheel 6b through the conduits 16 and 16a, the valve 4b and the conduit 17. Further, it is supplied from the master cylinder 1 into the wheel cylinder 12a of the right rear wheel 11a through the conduit 17a, the input chamber 109b of its valve apparatus 90, the output chamber 103b (the valve ball 106b being opened), and the conduit 15. Thus, the braking force can be securely obtained in the one conduit system.

When the valve 4b is changed over into the position B or C, tending to lock the front wheel 6b or the rear wheel 11a, the fluid pressure of the input and output chambers 109b and 103b becomes lower than that of the master cylinder pressure chamber 104b in the valve apparatus 90, and so the piston group 93 is moved to the right because of the fluid pressure difference between both sides of the larger diameter piston 94b. Accordingly, the valve ball 106b is moved further to the left and separated farther from the valve seat 108b. The valve ball 106b remains separated.

When the valve 4b is changed over into the position B, the wheel cylinders 7b and 12a of the wheels 6b and 11a are interrupted both from the master cylinder and from the reservoir 25b, so that the fluid pressure of the wheel cylinders 7b and 12a increases with the leftward movement of the piston group 93, since the volume of the output chambers 103b has been decreased.

When the valve 4b is changed over into the position C, the wheel cylinders 7b and 12a of the wheels 6b and 11a are disconnected from the master cylinder side, but are connected to the reservoir side. Thus, the braking forces of the front and rear wheels 6b and 11a are decreased, so that the wheels are prevented from locking.

Although the first to fourth embodiments of this invention have been described, the common operations and effects are summarized as follows:

As shown in FIG. 11, the wheel speed V of the front wheel changes with time, and the wheel speed V' of the rear wheel changes with time with a time leg $\Delta T$ behind the wheel speed V of the front wheel. In some cases, the wheel speed V of the front wheel changes with time logging the wheel speed V' of the rear wheel. In any case, the phase difference is caused by some rigidity of the front and rear shafts or the shaft combining the front and rear shafts.

Accordingly, the output signals S, S' (EVVL, EVHL, AVVL, AVHL etc.) of the front and rear wheels as the judging results change with time, as shown in the middle of FIG. 11. The output signals current level of the EVVL and EVHL ... as the judging results to hold the brake is equal to "$\frac{1}{2}$". The EVVL and EVHL signals are referred to as the "EV signal". The current level of the output signals AVVL, AVHL and as the judging results to relieve the brake is equal to "1". The signals AVVL and AVHL are referred to as the "AV signal".

At time $T_0$ the brake pedal is depressed. The brake fluid pressure P increases with time as shown in the bottom of FIG. 11. At time $t_1'$, the EV signal is generated from the front wheel, and so the brake fluid pressure of the conduit system of the corresponding front wheel is maintained constant by the logic part 31C or 31C' of the control unit 31. At time $t_2'$, the AV signal is generated from the front wheel. The brake fluid pressure of the corresponding conduit system is decreased. At time $t_3$, the EV signal is generated from the rear wheel, but the AV signal continues to be generated from the front wheel. Accordingly, the brake fluid pressure continues to be decreased. At time $t_4'$, the AV signal is also generated from the rear wheel. However, the brake fluid pressure P continues to decrease, since the AV signal of the front wheel continues.

At time $t_5'$, the AV signal of the front wheel disappears, and its EV signal is generated. At that time, the AV signal of the rear wheel continues. In the prior art, the brake fluid pressure p is decreased by the logical sum (OR) of the signals AV of the front and rear wheels, and so it still continues to decrease as shown by the graph $P_1$. On the other hand, the brake fluid pressure is decreased in accordance with the skid condition of the one of the front and rear wheels which has generated the signal AV sooner tha the other, according to than embodiments of this invention. Although the AV signal still continues from the rear wheel at time $t_5'$, the brake fluid pressure is held constant, as shown by the graphs $P_2$ or $P_3$, when the AV signal disappears from the front wheel. The brake fluid pressure does not depend on the AV signal of the rear wheel.

At time $t_6'$, the signal AV of the rear wheel disappears, and the signal EV is generated. In the prior art, the brake fluid pressure becomes constant at that time. At time $t_7'$, the EV signal of the front wheel steps between the levels "$\frac{1}{2}$" and "0". According to the third embodiment of this invention, the brake fluid pressure is increased stepwise in accordance with the one of the front and rear wheels which has generated the slow brake increasing signal sooner than the other. Accordingly, the brake fluid pressure starts to be increased stepwise as shown by the graph $P_3$ at time $t_7'$. At time $t_8'$, the signal EV of the rear wheel also steps between $\frac{1}{2}$ and "0". However, according to the third embodiment, the brake fluid pressure does not depend on the signal EV of the rear wheel, but depends on the signal EV of the front wheel. In the prior art and the embodiments except the third embodiment, the brake fluid pressure starts to be increased stepwise at time $t_8'$.

As shown, there is a long time difference between the generating times of the signals AV of the front and rear wheels because there is the large time difference $\Delta T$ between the changes of the wheel speeds of the front and rear wheels, as shown by the graphs V and V', due to the rigidity of the shaft. Since the brake fluid pressure is decreased by the logical sum of the signals AV of the front and rear wheels in the prior art, the brake is relieved too much by the difference between the brake fluid pressures $P_1$ and $P_2$ or $P_3$. Accordingly, the braking distance is lengthened further much in the prior art.

According to this invention, the braking distance can be shortened in the above described manner, in contrast to the prior art. Further, according to the third embodiment of this invention, the braking distance can be more shortened, since the brake fluid pressure is increased in accordance with the one of the front and rear wheels which has generated the brake increasing signal sooner than the other.

While the preferred embodiments have been described, variations thereto will occur to those skilled in the art within the scope of the present inventive concepts which are delineated by the following claims.

For example, in the third embodiment, the brake fluid pressure is increased stepwise in accordance with the skid condition of the one or ones of the rear wheels and also of the front wheel on the low side which has generated the slow brake increasing signal sooner than the other or others, in the control method in which the signal for controlling the fluid pressure control valve device is formed from the judging result of the front wheel on the low side and the select-low control signal of both of the rear wheels both. Instead, the brake fluid pressure may be increased stepwise in accordance with the one of the front and rear wheels on the low side which has generated the slow brake increasing signal sooner than the other.

In that case, for example, the circuit of FIG. 8 is added to the circuit of FIG. 7.

In the first embodiment, the brake-fluid pressure is increased stepwise in accordance with the skid condition of the one or ones of the rear wheels both and the front wheel on the low side which has generated the slow brake increasing signal later than the other or others. Instead, it may be increased stepwise in accordance with the skid condition of both of the one or the ones of the rear wheels and of the front wheel on the low side which has reached the stable region of the "$\mu$-slip characteristics" later than the other or others. Further the brake is increased stepwise in the above embodiments. However, it may also be continuously increased.

As described with reference to FIG. 11, the brake is relieved in accordance with the skid condition of the one of the front and rear wheels which has generated the brake relieving signal sooner than the other. However, further the time for the brake relieving may be limited to a predetermined time.

Although the skid condition of the one of the front and rear wheels which has generated the brake relieving signal later is neglected with respect to the brake relieving in the above embodiment, the brake may be relieved in accordance with the one of the front and rear wheels which has generated the brake relieving signal later than the other, when the same brake relieving signal still continues after the disappearance of the lapse of a predetermined time after the brake relieving signal which has been generated sooner.

In the above embodiments, this invention is applied to a 4WD vehicle. This invention may be applied both to a 4WD vehicle that is changeable to two-wheel drive and also to a 4WD vehicle that is not changeable. It may also be applied to vehicles of the usual type such as FF (front engine, front drive), FR (front engine, rear drive) and RR (rear engine, rear drive) type. In addition in the above embodiments, the LSD (Limited Slip Differential) or viscous coupling are used as the lock apparatus or torque distribution mechanism. In the viscous coupling, two plates are rotated in silicon oil, and shearing force occurs between them. Instead, a lock apparatus of the well-known other type or different torque distribution mechanism may be used. This invention may also be applied to a car in which the lock mechanism 47 is omitted in FIG. 5. In FIG. 4 and FIG. 7, the output terminals of AND gates 303a and 303b are connected to the input terminals of OFF delay timers 144a and 144b respectively. Instead, the output terminals of OR gates 211a and 211b may be connected to said input terminals of OFF delay timers 144a and 144b.

What is claimed is:

1. In an anti-skid control apparatus for a vehicle braking system including:
   (A) a pair of front wheels, and a pair of rear wheels;
   (B) wheel speed sensors associated with said wheels, respectively;
   (C) a first fluid pressure control valve device for controlling the brake fluid pressure of the wheel cylinder of one of said front wheels, arranged between a first fluid pressure generating chamber of a tandem master cylinder and said wheel cylinder of the one front wheel;
   (D) a second fluid pressure control valve device for controlling the brake fluid pressure of the wheel cylinder of another of said front wheels, arranged between a second fluid pressure generating chamber of said tandem master cylinder and said wheel cylinder of the other front wheel; and
   (E) a control unit receiving outputs of said wheel speed sensors for measuring or judging the skid conditions of said front and rear wheels and for generating instructions for controlling said first and second fluid pressure control valve devices and in which said control unit discriminates the frictionally lower one (designated as "low side") of the sides of the road on which said wheels are running, on the basis of the measuring or judging results of the skid conditions of said rear and/or front wheels, combines logically the measuring or judging result of the skid condition of the one rear wheel running on said low side of the road, with that of the one front wheel running on the same side as said low side, for generating the instruction for controlling said first or second fluid pressure control valve device for the corresponding front wheel, and generates the instruction for controlling said second or first fluid pressure control valve device for the other front wheel, on the basis of the measuring or judging result of the skid condition of the other front wheel running on the high side (frictionally higher side) independently of those of said rear wheels, the improvements in which a brake relieving instruction for decreasing the brake fluid pressure, of the instructions for controlling the first or second fluid pressure control valve device, is formed on the basis of the judging result of the one of the front wheel and rear wheel on the low side which generates a brake relieving signal for decreasing the brake fluid pressure, sooner than the other thereof.

2. An anti-skid control apparatus according to claim 1, in which, after said brake relieving instruction disappears, a brake increasing instruction for increasing the brake fluid pressure, of the instructions for controlling the first or second fluid pressure control valve device, is formed on the basis of the judging result of the one of the front wheel and rear wheel on the low side which has reached the stable region of the $\mu$-slip characteristics, sooner than the other.

3. An anti-skid control apparatus according to claim 2 in which a pressure selecting means for generating a pressure in accordance with the lower one of the brake fluid pressures of the front wheels controlled with said first and second fluid pressure control valve devices is arranged between the wheel cylinders of the front wheels and those of the rear wheels.

4. An anti-skid control apparatus according to claim 2 which is applied to a car of the four-wheel drive type.

5. An anti-skid control apparatus according to claim 1, in which, after said brake relieving instruction disappears, a brake increasing instruction for increasing the brake fluid pressure, of the instructions for controlling the first or second fluid pressure control valve device, is formed on the basis of the judging result of the one of the front wheel and rear wheel on the low side which generates a brake increasing signal for increasing the brake fluid pressure, sooner than the other thereof.

6. An anti-skid control apparatus according to claim 5 in which a pressure selecting means for generating a pressure in accordance with the lower one of the brake fluid pressures of the front wheels controlled with said first and second fluid pressure control valve devices is arranged between the wheel cylinders of the front wheels and those of the rear wheels.

7. An anti-skid control apparatus according to claim 5 which is applied to a car of the four-wheel drive type.

8. An anti-skid control apparatus according to claim 1, in which, after said brake relieving instruction disappears, a brake increasing instruction for increasing the brake fluid pressure, of the instructions for controlling the first or second fluid pressure control valve device, is formed on the basis of the judging result of the one of the front wheel and rear wheel on the low side which has reached the stable region of the $\mu$-slip characteristics, later than the other.

9. An anti-skid control apparatus according to claim 8 in which a pressure selecting means for generating a pressure in accordance with the lower one of the brake fluid pressures of the front wheels controlled with said first and second fluid pressure control valve devices is arranged between the wheel cylinders of the front wheels and those of the rear wheels.

10. An anti-skid control apparatus according to claim 8 which is applied to a car of the four-wheel drive type.

11. An anti-skid control apparatus according to claim 1, in which, after said brake relieving instruction disappears, a brake increasing instruction for increasing the brake fluid pressure, of the instructions for controlling the first or second fluid pressure control valve device, is formed on the basis of the judging result of the one of the front wheel and rear wheel on the low side which generates a brake increasing signal for increasing the brake fluid pressure, later than the other thereof.

12. An anti-skid control apparatus according to claim 11 in which a pressure selecting means for generating a pressure in accordance with the lower one of the brake fluid pressures of the front wheels controlled with said first and second fluid pressure control valve devices is arranged between the wheel cylinders of the front wheels and those of the rear wheels.

13. An anti-skid control apparatus according to claim 11 which is applied to a car of the four-wheel drive type.

14. An anti-skid control apparatus according to claim 1, in which, in the lapse of a predetermined time after said brake relieving instruction disappears, a further brake relieving instruction is formed on the basis of the judging result of said other of the front wheel and rear wheel on the low side, when said other wheel continuously still generates a brake relieving signal.

15. An anti-skid control apparatus according to claim 14, in which the time of said further brake relieving instruction is limitted to a predetermined time.

16. An anti-skid control apparatus according to claim 15 which is applied to a car of the four-wheel drive type.

17. An anti-skid control apparatus according to claim 14 in which a pressure selecting means for generating a pressure in accordance with the lower one of the brake fluid pressures of the front wheels controlled with said first and second fluid pressure control valve devices is arranged between the wheel cylinders of the front wheels and those of the rear wheels.

18. An anti-skid control apparatus according to claim 14 which is applied to a car of the four-wheel drive type.

19. An anti-skid control apparatus according to claim 14 in which a pressure selecting means for generating a pressure in accordance with the lower one of the brake fluid pressures of the front wheels controlled with said first and second fluid pressure control valve devices is arranged between the wheel cylinders of the front wheels and those of the rear wheels.

20. An anti-skid control apparatus according to claim 1 which is applied to a car of the four-wheel drive type.

21. An anti-skid control apparatus according to claim 1 in which a pressure selecting means for generating a pressure in accordance with the lower one of the brake fluid pressures of the front wheels controlled with said first and second fluid pressure control valve devices is arranged between the wheel cylinders of the front wheels and those of the rear wheels.

22. An anti-skid control apparatus according to claim 21 which is applied to a car of the four-wheel drive type.

23. In an anti-skid control apparatus for a vehicle braking system including:
  (A) a pair of front wheels, and a pair of rear wheels;
  (B) wheel speed sensors associated with said wheels, respectively;
  (C) a first fluid pressure control valve device for controlling the brake fluid pressure of the wheel cylinder of one of said front wheels, arranged between a first fluid pressure generating chamber of a tandem master cylinder and said wheel cylinder of the one front wheel;
  (D) a second fluid pressure control valve device for controlling the brake fluid pressure of the wheel cylinder of another of said front wheels, arranged between a second fluid pressure generating chamber of said tandem master cylinder and said wheel cylinder of the other front wheel; and
  (E) a control unit receiving outputs of said wheel speed sensors for measuring or judging the skid conditions of said front and rear wheels and for generating instructions for controlling said first and second fluid pressure control valve devices and in which said control unit discriminates the frictionally lower one (designated as "low side") of the sides of the road on which said wheels are running, on the basis of the measuring or judging results of the skid conditions of said rear and/or front wheels, combines logically the measuring or judging results of the skid conditions of said rear wheels with the measuring or judging result of the skid condition of the one front wheel running on the low side for generating the instruction for controlling said first or second fluid pressure control valve device for the corresponding front wheel, and generates the instruction for controlling said second or first fluid pressure control valve device for the other front wheel, on the basis of the measuring or judging result of the skid condition of the other front wheel running on the high side (frictionally higher side) independently of those of said rear wheels, the improvements in which a brake relieving instruction for improvements in which a brake relieving instruction for decreasing the brake fluid pressure, of the instructions for controlling the first or second fluid pressure control valve device, is formed on the basis of the judging result of the one or ones of the rear wheels both and front wheel on the low side which generates a brake relieving signal for decreasing the brake fluid pressure, sooner than the other or others thereof.

24. An anti-skid control apparatus according to claim 23, in which, after said brake relieving instruction disappears, a brake increasing instruction for increasing the brake fluid pressure, of the instructions for controlling the first or second fluid pressure control valve device, is formed on the basis of the judging result of the one or ones of the rear wheel both and front wheel on the low side which has reached the stable region of the $\mu$-slip characteristics, sooner than the other.

25. An anti-skid control apparatus according to claim 24 in which a pressure selecting means for generating a pressure in accordance with the lower one of the brake fluid pressures of the front wheels controlled with said first and second fluid pressure control valve devices is arranged between the wheel cylinders of the front wheels and those of the rear wheels.

26. An anti-skid control apparatus according to claim 24 which is applied to a car of the four-wheel drive type.

27. An anti-skid control apparatus according to claim 23, in which, after said brake relieving instruction disappears, a brake increasing instruction for increasing the brake fluid pressure, of the instructions for controlling the first or second fluid pressure control valve device, is formed on the basis of the judging result of the one or ones of the rear wheels both and front wheel on the low side which generates a brake increasing signal for increasing the brake fluid pressure, sooner than the other or others thereof.

28. An anti-skid control apparatus according to claim 27 in which a pressure selecting means for generating a pressure in accordance with the lower one of the brake fluid pressures of the front wheels controlled with said first and second fluid pressure control valve devices is arranged between the wheel cylinders of the front wheels and those of the rear wheels.

29. An anti-skid control apparatus according to claim 27 which is applied to a car of the four-wheel drive type.

30. An anti-skid control apparatus according to claim 23, in which, after said brake relieving instruction disappears, a brake increasing instruction for increasing the brake fluid pressure, of the instructions for controlling the first or second fluid pressure control valve device, is formed on the basis of the judging result of the one or ones of the rear wheels both and front wheel on the low side which has reached the stable region of the μ-slip characteristics, later than the other or others thereof.

31. An anti-skid control apparatus according to claim 30 in which a pressure selecting means for generating a pressure in accordance with the lower one of the brake fluid pressures of the front wheels controlled with said first and second fluid pressure control valve devices is arranged between the wheel cylinders of the front wheels and those of the rear wheels.

32. An anti-skid control apparatus according to claim 30 which is applied to a car of the four-wheel drive type.

33. An anti-skid control apparatus according to claim 23, in which, after said brake relieving instruction disappears, a brake increasing instruction for increasing the brake fluid pressure, of the instructions for controlling the first or said fluid pressure control valve device, is formed on the basis of the judging result of the one or ones of the rear wheels both and front wheel on the low side which generates a brake increasing signal for increasing the brake fluid pressure, later than the other or others thereof.

34. An anti-skid control apparatus according to claim 33 in which a pressure selecting means for generating a pressure in accordance with the lower one of the brake fluid pressures of the front wheels controlled with said first and second fluid pressure control valve devices is arranged between the wheel cylinders of the front wheels and those of the rear wheels.

35. An anti-skid control apparatus according to claim 33 which is applied to a car of the four-wheel drive type.

36. An anti-skid control apparatus according to claim 23, in which, in the lapse of a predetermined time after said brake relieving instruction disappears, a further brake relieving instruction is formed on the basis of the judging result of said other or other of the rear wheels both and front wheel on the low side, when said other wheel continuously still generates a brake relieving signal.

37. An anti-skid control apparatus according to claim 36, in which the time of said further brake relieving instruction is limited to a predetermined time.

38. An anti-skid control apparatus according to claim 37 in which a pressure selecting means for generating a pressure in accordance with the lower one of the brake fluid pressures of the front wheels controlled with said first and second fluid pressure control valve devices is arranged between the wheel cylinders of the front wheels and those of the rear wheels.

39. An anti-skid control apparatus according to claim 37 which is applied to a car of the four-wheel drive type.

40. An anti-skid control apparatus according to claim 36 in which a pressure selecting means for generating a pressure in accordance with the lower one of the brake fluid pressures of the front wheels controlled with said first and second fluid pressure control valve devices is arranged between the wheel cylinders of the front wheels and those of the rear wheels.

41. An anti-skid control apparatus according to claim 36 which is applied to a car of the four-wheel drive type.

42. An anti-skid control apparatus according to claim 23 in which a pressure selecting means for generating a pressure in accordance with the lower one of the brake fluid pressures of the front wheels controlled with said first and second fluid pressure control valve devices is arranged between the wheel cylinders of the front wheels and those of the rear wheels.

43. An anti-skid control apparatus according to claim 42 which is applied to a car of the four-wheel drive type.

44. An anti-skid control apparatus according to claim 23 which is applied to a car of the four-wheel drive type.

* * * * *